United States Patent [19]
Yuasa et al.

[11] Patent Number: 4,900,135
[45] Date of Patent: * Feb. 13, 1990

[54] OPTICAL ELEMENT

[75] Inventors: Satoshi Yuasa, Yokohama; Yukuo Nishimura, Sagamihara; Yoko Yoshinaga, Machida; Hirohide Munakata, Yokohama; Masahiro Haruta, Tokyo, all of Japan

[73] Assignee: Canon Kabushiki Kaisha, Tokyo, Japan

[*] Notice: The portion of the term of this patent subsequent to May 23, 2006 has been disclaimed.

[21] Appl. No.: 850,171

[22] Filed: Apr. 10, 1986

[30] Foreign Application Priority Data

| Apr. 13, 1985 | [JP] | Japan | 60-077569 |
| Apr. 30, 1985 | [JP] | Japan | 60-091023 |
| Jun. 18, 1985 | [JP] | Japan | 60-130699 |
| Jul. 2, 1985  | [JP] | Japan | 60-143972 |
| Jul. 3, 1985  | [JP] | Japan | 60-144500 |

[51] Int. Cl.$^4$ ............................................. G02F 1/01
[52] U.S. Cl. ...................................... 350/354; 350/353
[58] Field of Search ............................ 350/353, 354

[56] References Cited

U.S. PATENT DOCUMENTS

| 4,169,661 | 10/1979 | Yamada et al. | 350/353 |
| 4,307,942 | 12/1981 | Chahroudi | 350/353 |
| 4,536,061 | 8/1985  | Nishimura | 350/354 |

*Primary Examiner*—Eugene R. LaRoche
*Assistant Examiner*—Nathan W. McCutcheon
*Attorney, Agent, or Firm*—Fitzpatrick, Cella, Harper & Scinto

[57] ABSTRACT

An optical element comprised a pair of plates between which an optical modulation liquid layer is sandwiched, the optical modulation liquid layer exhibiting a light scattering property caused by suspension of fine particle polymer when not heated and exhibiting transparency caused by dissolution of fine particle polymer when heated, the change of such light scattering property to transparency being reversible.

11 Claims, 12 Drawing Sheets

OPTICAL ELEMENT

BACKGROUND OF THE INVENTION

1. Field of the Invention

This invention relates to a novel optical element, and more particularly, to an optical element employing a light scattering property of a soluble polymer.

2. Description of the Related Art

Recent development of office automation (OA) leads to a popularization of display devices in the field of business machines. Display devices are desired which do not cause fatigue of eyes of operators of the device even after a long time period of operation. There have been known non-luminant type of display elements such as an electric-field-induced coloring display devices (ECD), and liquid crystal display devices (LCD) as a display element.

Disadvantages are encountered, however, that an ECD cannot exhibit sufficient contrast of display and that an LCD cannot give a sufficiently large visual field angle. The similar disadvantages are encountered in these devices when the devices are employed as a light modulation element such as a light shutter.

SUMMARY OF THE INVENTION

The present invention overcomes the abovementioned drawbacks of conventional elements.

A primary object of the present invention is to provide an element of high quality which has a wide visual field angle as a display device, is excellent in clearness and does not cause fatigue of eye, and also a light modulation element which exhibits high contrast and has a low dependency on light incident angle.

The object of the present invention has been achieved by an optical element comprising a pair of plates between which an optical modulation liquid layer is sandwiched, the optical modulation liquid layer exhibiting a light scattering property caused by suspension of fine particle polymer when not heated and exhibiting transparency caused by dissolution of fine particle polymer when heated, the change of such light scattering property to transparency being reversible.

DESCRIPTION OF THE PREFERRED EMBODIMENTS

Figure 1:
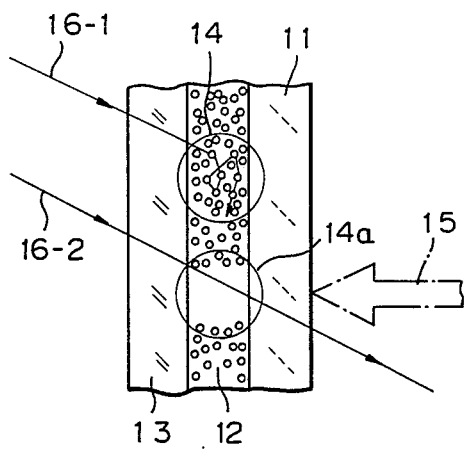
FIGS. 1-4 illustrate constructions showing the basis of the present invention.

The basic construction of the present invention is explained referring to FIG. 1. In FIG. 1, the numeral 11 indicates a substrate, 12 an optical modulation liquid layer, and 13 a transparent protective plate. As the substrate 11 used in the present invention, any of known substrates for optical elements can be used as far as the substrate is inert to the solvent constituting the polymer emulsion mentioned later. For example, when the optical element is of a light transmission type, there may be used a transparent material such as glass, plastics and the like, and when the optical element is of a light reflection type, there may be optionally used a material which light can not pass through, for example, semiconductors such as silicon and the like, ceramics, metals such as aluminum and the like, and opaque plastics, or the above-mentioned transparent materials on which a metal film is deposited. The substrate is preferably about 100 $\mu$m–5 mm thick in case of the light transmission type or reflection type regardless of the shape.

As the transparent protective plate 13 constituting the optical element of the present invention, there may be used any of known transparent materials such as glass, plastics, dielectric member and the like, and the thickness of the transparent protective plate is preferably about 100 $\mu$m–2 mm for any type of optical elements. Particularly, when the optical element is of a light transmission type, there may be used a transparent material such as glass, plastics and the like, and when the optical element is of a light reflection type, there may be optionally used a material which light can not pass through, for example, semiconductors such as silicon and the like, ceramics, metals such as aluminum and the like, and opaque plastics, or the above-mentioned transparent materials on which a metal film is deposited.

The optical modulation liquid layer of the present invention scatters light at a cooled state and is transparent at a heated state: the light scattering and the transparency are reversible. The preferable optical modulation liquid layer 12 of the present invention may be a polymer emulsion layer which is light scattering at a room temperature (cooled state).

The polymer emulsion comprises a soluble polymer emulsified in an appropriate organic solvent, water, or their mixture.

As the organic polymer emulsion, there may be mentioned polyalkenes such as polypropylene, polyisobutene and the like, polydienes such as polybutadiene, polyisoprene and the like, polyvinyl compounds such as polyvinyl acetate, poly(meth)acrylate, poly(meth)acryl amide and the like, polystyrenes such as polystyrene, poly-α-methylstyrene and the like, copolymers of monomers constituting the above-mentioned or other polymers, polyethers such as polyethylene oxide and the like, polyimines such as polyethylene imine and the like, polyesters such as polyoxyethylene adipoyl and the like, polyamides such as polyglycine and the like, and other known chain polymers.

As a solvent used for forming organic polymer emulsion by the above-mentioned polymers there may be mentioned known organic solvents, water or mixtures thereof, for example, water, alcohols such as methanol, ethanol and the like, ketones such as acetone, methyl ethyl ketone and the like, hydrocarbons such as pentane, cyclohexane, benzene and the like, halogenated hydrocarbons such as tetrachloroethane, dichlorobenzene, and the like, esters such as ethyl formate, ethyl acetate, isoamyl acetate and the like, ethers such as dioxane, diglycide and the like, amides such as dimethyl formamide, dimethyl acetamide, and the like, sulfur-containing solvents such as dimethyl sulfoxide and the like, or mixtures thereof. In addition, there may be mentioned emulsions composed of the above-mentioned solvents in which a solute such as lithium perchlorate, ammonium propionate, urea, glucose and the like is dissolved.

The polymer emulsion used in the present invention can be formed from the above-mentioned polymer and a solvent. An important point is the combination of the polymer and the solvent, and the combination is to be such that the polymer can form an emulsion and the emulsified polymer is dissolved at a temperature which is not so high, preperably about 30–100° C. by heat absorption.

The present inventors have found that, upon formation of polymer emulsion, if a polymer and a solvent are appropriately combined, the polymer is dissolved to a solution and transparency is formed by change in temperature, that is, temperature rise, and further found that the polymer emulsion is formed into, for example, a thin layer of about 1–1,000 μm, preferably 1–100 μm and when heat is applied partly to the thin layer, transparency is immediately formed at the heated portion while when heat is removed, the transparent portion is immediately eliminated. In addition, it has been found that the very excellent heat response, that is, emulsification ← → dissolution, (transparency), is useful as a light modulation member of a light modulation apparatus and when this light modulation member is used, there can be obtained a light modulation apparatus free from various drawbacks.

The polymer emulsion having such an excellent heat response can be easily formed by selecting a solvent suitable for the selected polymer and controlling the solvent affinity of the polymer.

Further, the heat response of an organic polymer emulsion can be controlled to a desired range by once forming a polymer solution by using a relatively good solvent and then mixing a relatively poor solvent therewith for precipitation of the polymer to form an emulsion, or by using a solvent mixture of various mixing ratio.

According to the detailed study of the present inventors, it has been found that a desired organic polymer emulsion can be produced by using a poly(meth)acryl amide type polymer, preferably, N-alkyl substituted poly(meth)acryl amide, and water.

As the desired poly(meth)acrylamide derivative polymer, there may be mentioned homopolymers of monomers such as N-ethyl (meth)acrylamide, N-n-propyl (meth)acrylamide, N-iso-propyl (meth)acrylamide, N-cyclopropyl (meth)acrylamide, N-N-ethyl methyl (meth)acrylamide, N-N-diethyl methacrylamide, N-acrylpyrrolidone, N-acrylpiperidine and the like, or copolymers of the above-mentioned monomer with other monomer.

The polymer emulsions composed of poly(meth)acrylamide derivative and water are the best organic polymer emulsion since the reversible change between emulsification and dissolution (transparency) by heat occurs at about 0–80° C. and the heat response is very sharp.

The light modulation member used in the present invention, that is, a polymer emulsion thin layer having the foregoing thickness may be produced by forming a polymer gel having a concentration of organic polymer of about 0–20 % by weight and placing the polymer emulsion between a transparent protective plate and a substrate.

An organic polymer emulsion having such excellent heat responsivity can be easily prepared by choosing the solvent suitable for the selected organic polymer and regulating the solvent affinity of the organic polymer, or otherwise according to a method in which an organic polymer solution is once prepared in a relatively good solvent and the solution is made emulsified by admixing a relatively poor solvent thereto to regulate the heat responsivity, or further, according to a method of using a mixed solvent of various mixing ratio, giving a preferable heat responsivity within a desired range. A suitable surfactant, dispersing agent or protective colloid may naturally be employed as desired in the preparation of such organic polymer emulsion for the purpose of securing a emulsifiability of the polymer and stability of the emulsion.

As the transparent protective plate 13, there may be mentioned a transparent member such as glass, plastics, dielectric members and the like. In order to improve the contrast, the surface of substrate 11 may be provided a visible light reflecting layer and a visible light absorbing layer (not shown).

The principle of operation of the optical element (imaging and light modulation) will be explained using FIG. 1, which shows an example of the transmission type.

First, where optical modulation liquid layer 12 is not warmed (i.e. at a low temperature state), the polymer is precipitated in a solvent to form a polymer emulsion so that the light 16-1 incident on the low temperature region of optical modulation liquid layer 12 is scattered (diffused).

On the other hand, in the case where a predetermined position in optical modulation liquid layer 12 is warmed according to an information signal, for example, by an external heating means such as irradiation of infrared ray beam 15, a precipitated polymer in the warmed portion 14a is dissolved into a solution and the portion becomes transparent.

Therefore, light 16-2 incident on the warmed region 14a passes through optical modulation liquid layer 12 as it is, and then goes out from substrate 11. When the temperature at the warmed region 14 is lowered, the light incident thereon is scattering normally again.

As is clear from the above, the feature of the present invention is that light modulation and display are effected by thermally controlling scattering (opaque) and non-scattering (transparent) in an optical modulation liquid layer.

Figure 2:
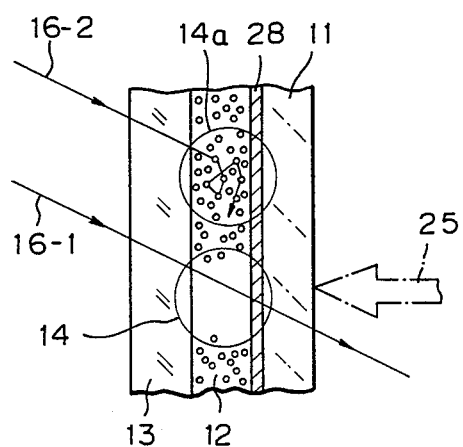

FIG. 2 illustrates a preferable embodiment of the present invention. In the figure, the numeral 11 denotes a substrate; 12 an optical modulation liquid layer; 13 a transparent protective plate; 28 an infrared-ray-absorbing layer corresponding to a heat-generating element. The substrate 11, the optical modulation liquid layer 12, the transparent protective plate are identical to the ones described in the explanation of FIG. 1.

As a heat generating element in the present invention, there may be used, for example, an infrared-ray-absorbing layer 28 when heating by absorbing infrared ray is utilized as the heating means. The infrared-ray-absorbing layer 28 can be produced by forming a film of various known inorganic or organic materials which themselves are not easily melted. Such material includes preferably Si, SiO, $SiO_2$, ZnS, $As_2S_3$, $Al_2O_3$, NaF, ZnSe, Gd.Tb.Fe, carbon black, metal phthalocyanine and the like. The thickness of the infrared ray absorbing layer 28 is preferably 500 Å–10000 Å.

As a transparent protective plate 13, there may be used a transparent member composed of glass, plastics, dielectric substance or the like. In order to improve contrast, a visible ray reflecting layer or visible ray absorbing layer (not shown) may be provided on substrate 11.

The principle of operation of the optical element (imaging and light modulation) will be explained using FIG. 2, which shows an example of the transmission type.

First, where optical modulation liquid layer 12 is not warmed (i.e. at a low temperature state), the polymer is precipitated in a solvent to form a polymer emulsion so that the light 16-2 incident on the low temperature region of optical modulation liquid layer 12 is scattered (diffused).

On the other hand, in the case where a predetermined position in optical modulation liquid layer 12 is warmed according to an information signal, for example, by an external heating means such as irradiation of infrared ray beam 25, a precipitated polymer in the warmed portion 14a is dissolved into a solution and the portion becomes transparent.

Therefore, light 16-1 incident on the warmed region 14 passes through optical modulation liquid layer 12 as it is, and then goes out from substrate 11. When the temperature at the warmed region 14 is lowered, the light incident thereon is scattering normally again.

As is clear from the above-mentioned explanation, the present invention is concerned with light modulation and display effected by thermally controlling scattering (opaque) and non-scattering (transparent).

In another preferable embodiment of the present invention, the aforementioned optical modulation liquid layer 12 may contain a light-absorbing heat-generating agent.

As the light absorbing heat generating agent, there may be used any material capable of selectively absorbing a light of a certain wavelength to generate heat and being dissolved in the above-mentioned solvent. Such materials are easily commercially available as various organic colorants, inorganic colorants, organic salts, inorganic salts, UV absorbers, IR absorbers, and the like. In the present invention, there may be used the material selected appropriately. Preferable example is IR absorbers, for example, where the solvent is an aqueous solvent, metal salts such as copper sulfate, nickel sulfate and the like are preferred, and where the solvent is an organic material, organic IR absorbers such as IRG-003 (tradename, supplied by Nihon Kayaku K.K.) and the like are preferred. In addition, as other examples of IR absorbers, there may be mentioned cyanines, xanthene derivatives, thiapyrylium salt derivatives, pyrylium salt derivatives and like.

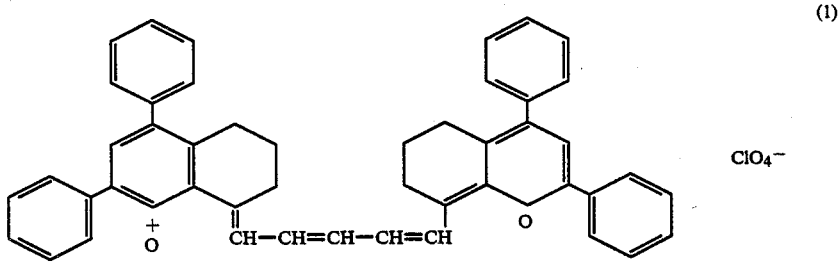

(1)

$\lambda max = 1,040$ nm      $\epsilon = 125 \times 10^3$

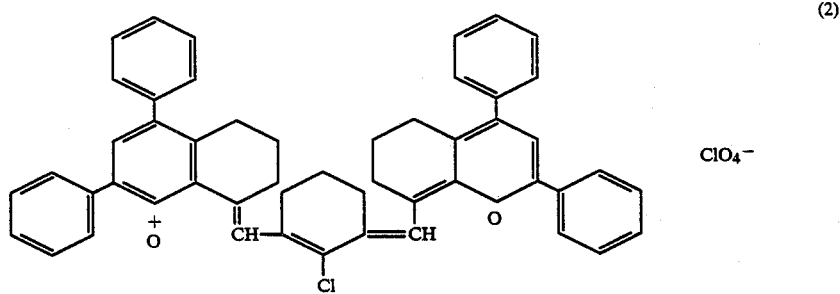

(2)

$\lambda max = 1,120$ nm      $\epsilon = 113 \times 10^3$

-continued

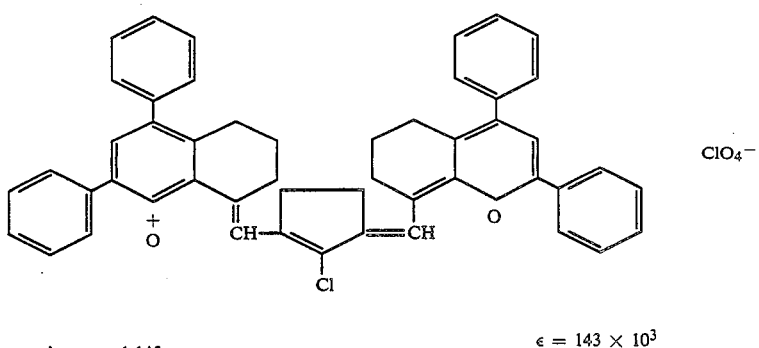

λmax = 1,145 nm      $\epsilon = 143 \times 10^3$ (3)  ClO$_4^-$

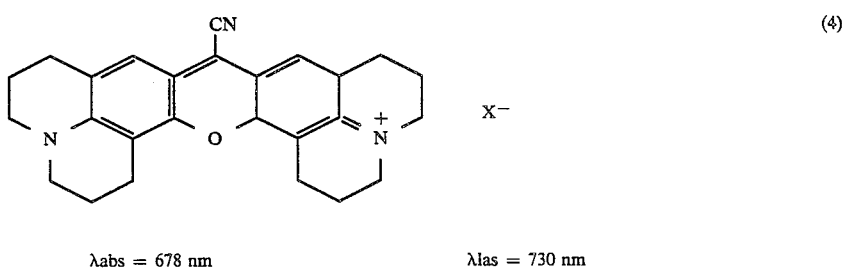

λabs = 678 nm      λlas = 730 nm (4)  X$^-$

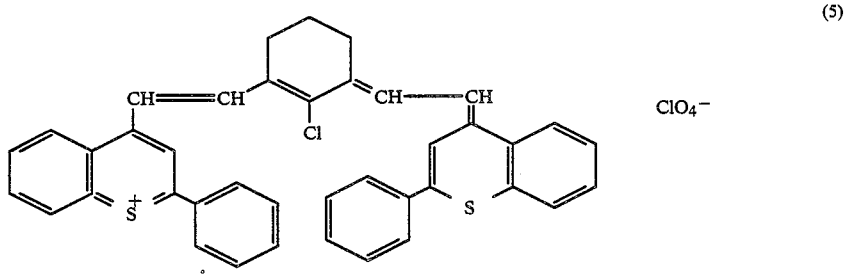

(5)  ClO$_4^-$

The light absorbing heat generating agent is to be selected such that the agent can be preferably combined with a polymer emulsion and a solvent contained therein. In general, the light absorbing heat generating agent is dissolved at a concentration of about $10^{-5}$-$10^{-2}$ M and used though it varies depending on the relation with the solvent and the polymer gel to be combined therewith. The light absorbing heat generating agent is preferably added upon forming the polymer emulsion.

Figure 5:
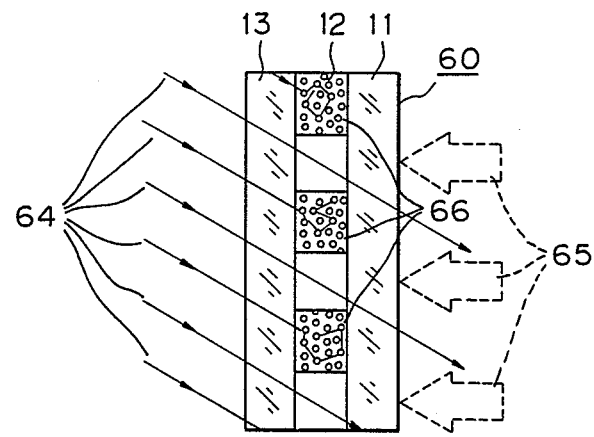
FIG. 5 illustrates a light transmission type of optical element of the present invention.
Figure 6:
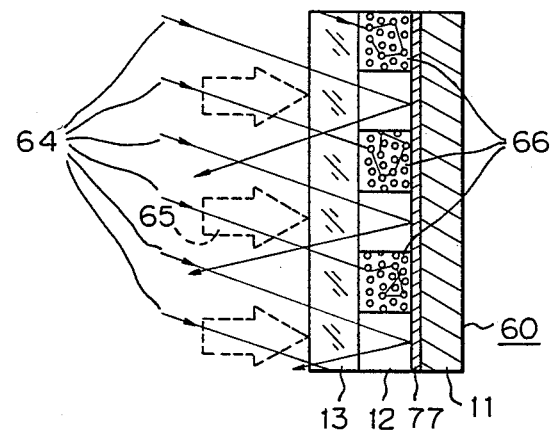
FIG. 6 illustrates a light reflection type of optical element of the present invention.

FIGS. 5 and 6 illustrate the above-mentioned embodiments: FIG. 5 illustrates a light-transmissive optical element, and FIG. 6 illustrates a light-reflective optical element.

In FIG. 5, an optical element 60 of a light transmission type is constituted of the above-mentioned transparent plate 11, optical modulation liquid layer 12 containing a polymer emulsion as above and transparent protective plate 13. In case that a light beam 64 having a wavelength not absorbed by the light absorbing heat generating agent present in polymer emulsion (non-absorbed light) is projected to optical element 60, the non-absorbed light 64 is scattered by precipitated polymer emulsion.

On the contrary, when a light beam 65 which is absorbed by the light absorbing heat generating agent (absorbed light) is projected to the optical element, the light absorbed to the light absorbing heat generating agent uniformly present in the polymer emulsion generates heat by which the polymer emulsion is heated resulting in, for example, that the heated portion is dissolved to form a transparent portion 66 and then the non-absorbed 64 passes through the portion. Therefore, when the non-absorbed light 64 is projected to the whole surface and an absorbed light 65 is projected as an information light in a form of an optional pattern from the same direction or from the opposite side of the optical element 60, there is formed an image 66 following the information source.

In FIG. 5, an image display is diagrammatically shown in which as a light absorbing heat generating agent, there is used an infrared ray absorber and as a non-absorbed light 64, there is used a white light beam and as an absorbed light 65, there is used an infrared ray.

FIG. 6 shows diagrammatically an embodiment of a reflection type where a light reflection layer 77 is provided on the surface of a substrate, and the principle of performance is the same as that in FIG. 5 except that non-absorbed light 64 is reflected.

In the above, as a light absorbing heat generating agent, an infrared ray absorber is used, but in the case where, in place of the infrared ray absorber, there are used various colorant capable of absorbing a light beam of a specified wavelength and generating heat or a UV absorber absoring ultraviolet ray and generating heat, and a light which is not absorbed by the light absorbing heat generating agent is used simultaneously, it will be clear that various optical displays can be effected by the same principle of performance as that in the above-mentioned embodiment.

According to a still further preferred embodiment of the present invention, there is provided flexible optical element comprising a substrate, a light modulation member and a transparent protective plate, the substrate and the transparent protective plate being both made of flexible materials, the light modulation member comprising a polymer liquid containing a solvent and a polymer, the polymer liquid becoming transparent when heated and becoming light scattering when cooled.

More specifically, the optical element of the present invention comprises basically a substrate, a transparent protective plate keeping a certain gap from the substrate, and an optical modulator sandwiched between the substrate and the transparent protective plate, and is characterized in that a deformable polymer liquid is employed which becomes transparent by heating and becomes light-scattering by cooling as the optical modulator, and both the substrate and the transparent protective plate are made from a flexible material.

As the substrate and the transparent protective plate primarily characterizing the present invention, any of known flexible materials can be used as far as the materials is inert to a solvent constituting a polymer liquid mentioned later. For example, when the optical element is of a light transmission type, there may be, for both of the substrate and the transparent protective plate, be used a transparent plastic material such as polyolefines, polyesters, polyacrylic acid esters, polyurethans, polyamides, polycarbonates and the like, and when the optical element is of a light reflection type, there may be optionally used the above materials for the transparent protective plate, and for the substrate there may be optionally used materials through which light can not pass, for example, metallic films such as aluminum and like, and opaque plastics, or the above-mentioned transparent materials on which a metallic film is vapor deposited.

Both of the substrate and the transparent protective plate are preferably about 0.01–0.4 mm thick in case of the light transmission type or reflection type regardless of the shape.

The polymer liquid, which characterizes the present invention and is used therein, is composed of a suitable organic solvent or water, or a mixture thereof and a soluble polymer thereto.

These liquids of the present invention include a polymer liquid in which a polymer is dissolved at normal temperature, an emulsion or a suspension in which a polymer is emulsified or suspended without dissolution of the polymer, and a polymer gel formed by that the polymer absorbs and retains a solvent. Such polymer and solvent have been known. However, the polymer liquid used in the present invention is necessary to exhibit a light-scattering property at a certain range of temperature and to exhibit transparency above the range of temperature since a polymer or a polymer gel is dissolved.

Examples of such organic polymers include: polyalkenes such as polypropylene, polyisobutene and the like; polydienes such as polybutadiene, polyisoprene and the like; polyvinyls such as polyvinyl acetate, poly(meth)acrylic acid esters, poly(meth)acrylamides and the like; polystyrenes such as polystyrene, poly α-methylstyrene and the like; copolymers of monomers constituting the above-mentioned or other polymers; polyethers such as polyethylene oxide, polypropylene oxide; polyimines such as polyethylene imine and the like; polyesters such as polyethylene succinate, polyethylene adipate, polyoxyethylene adipoyl; polyamides such as polyglycine, nylon 66 and the like; silicon type resins such as polydimethyl siloxane and the like; polysaccharides such as cellulose acetate, amylopectin and the like; and other known polymers and a mixture thereof.

In addition to the above polymers capable of forming a solution, there can be used polymers as described above which have very high molecular weights and absorb and retain a solvent to form gels, and crosslinked polymers which are produced by crosslinking the above polymers. When gel of a crosslinked polymer used causes a reversible change "transparent ← → light scattering", the same effects as in the foregoing polymers are obtained.

Such crosslinked structure can be easily formed by various known methods, for example, a method where upon producing the polymer, a polyfunctional monomer is partly used as a crosslinking agent to form a crosslinked structure simultaneously with polymerization; a method where a reactive monomer is also used to form crosslinking points in a polymer and a crosslinked structure is produced utilizing the crosslinking points; and a method where crosslinking is caused by using radiation or the like.

As a solvent used for forming organic polymer liquid by the above-mentioned polymers there may be mention known organic solvents, water or mixtures thereof, for example, water, alcohols such as methanol, ethanol, propanol, ethylene glycol, glycerol and the like, ketones such as acetone, methyl ethyl ketone and the like, hydrocarbons such as pentane, cyclohexane, toluene, chlorobenzene, anisole, benzene and the like, halogenated hydrocarbons such as chloroform, dichloroethane, tetrachloroethane, monochlorobenzene, dichlorobenzene, and the like, esters such as ethyl formate, ethyl acetate, isoamyl acetate and the like, ethers such as dioxane, diglycide and the like, amides such as dimethyl formamide, dimethyl acetamide, and the like, sulfur-containing solvents such as dimethyl sulfoxide and the like, or mixtures thereof. In addition, there may be mentioned solutions composed of the above-mentioned solvents in which a solute such as an electrolyte, for example, acids, bases, salt and the like, urea, glucose and the like is dissolved.

The polymer liquid used in the present invention can be formed from the above-mentioned polymer and a solvent. An important point is the combination of the polymer and the solvent, and the combination is to be such that the polymer can form an emulsion or suspension and the resulting emulsion or suspension become white turbid or transparent by dissolution of precipitated polymers at a temperature which is not so high, preferably about 20–100° C. by heat absorption.

The present inventors have found that, upon formation of polymer liquid, if a polymer and a solvent are appropriately combined so that, for example, a critical dissolution temperature of the polymer in the solvent (the critical dissolution temperature corresponds to flory temperature $\theta$ of a single polymer in a simple solvent) may be within 5° C. to 230° C., preferably 20° C. to 110° C., the polymer in the solvent is dissolved to a solution and transparency is formed by change in temperature, that is, temperature rise, and further found that the polymer liquid is formed into, for example, a thin layer of about 1–1,000 μm, preferably 1–100 μm and when heat is applied partly to the thin layer, the heated portion immediately becomes transparent while when heat is removed, the transparent portion is immediately eliminated. In addition, it has been found that the very excellent heat response, that is, precipitation (emulsification) ← → dissolution (transparent), is useful as a light modulation member of a light modulation apparatus.

In addition, such polymer liquid can be freely deformed, and hence the light modulation element can be rendered flexible by utilizing the liquid and flexible materials for a substrate and a transparent protective plate. When this light modulation member is used, there can be obtained a light modulation apparatus free from various drawbacks.

The polymer liquid having such an excellent heat response can be easily formed by selecting a solvent suitable for the selected polymer and controlling the solvent affinity of the polymer.

Further, the heat response of a polymer liquid can be controlled to a desired range by once forming an organic polymer solution or a transparent polymer gel, for example, by using a relatively good solvent and then mixing a relatively poor solvent thereto to emulsify the precipitated polymer, by using a solvent mixture of various mixing ratio, or by using a solvent to which a variety of solutes are added.

The light modulation member used in the present invention, that is, an organic polymer liquid may be produced by forming a polymer liquid having a concentration of organic polymer of about 0.2–20 % and forming the polymer liquid into a thin layer having about the above thickness between a transparent protective plate and a support. When the concentration of the polymer is below the above-mentioned range, change of optical properties of the light modulation element becomes smaller, while when the concentration is above the range, its speed of response becomes lower. Therefore, it is preferred that the concentration is within the range.

Since the present optical element is flexible, it can be used in a bent state. When the element is bent, it is also preferred to allow a suitable spacer to be included between a substrate and a transparent protective plate. Preferable examples of such spacers include porous film materials such as paper, nonwoven fabric and the like. Such a spacer is not needed if the thickness of the polymer liquid layer will not change.

The present optical elements requires a means for heating a polymer liquid layer according to information signals. It is preferred that such heating means is incorporated in the element. The means can also be attached to the element upon its use. As the heating means, any of means known for heating can be used. Preferable examples of such means are resistive heat-generating materials which generate heat based on electric resistance, and heating materials which generate heat by absorbing infrared ray. As the resistive heat-generating layer, there can be used: metals such as nichrome and the like; alloys; transparent or opaque metal compounds such as hafnium boride, tantalum nitride, tin oxide, indium tin oxide and the like; and electroconductive plastics such as carbon resins, metal-dispersed plastics and the like.

An infrared ray absorbing layer can be made of inorganic or organic materials which absorb radiation having desired wavelength, for example, Si, SiO, $SiO_2$, ZnS, $As_2S_3$, $Al_2O_3$, NaF, ZnSe, Cd.Tb.Fe, carbon black, metal phthalocyanines, pigments and the like.

The optical element of the present invention is basically constituted of the above-mentioned materials. In addition, an insulating layer can be preferably provided on a surface of the heating means of the element in order to protect the heating means from polymer liquid. As materials for the insulating layer, there can be used, for example, polymeric materials containing any of methyl methacrylate, butyl acrylate, styrene-acrylonitrile copolymer, polyesters, polyamides and the like, which are not soluble to a solvent constituting a polymer liquid layer. Further, the insulating layer can be colored in order to control a contrast in a run of the optical element. The element can also have a pigmented layer apart from the insulating layer for the same purpose as above. When provided with the insulating layer and/or the pigmented layer, it is necessary that a distance from the resistive heat-generating layer or the infrared-ray-absorbing layer to the polymer liquid layer is not more than 500 μm, preferably 100 μm in order not to prevent rapidly heat transportation. Further, as a method for constituting the optical element, that is, for laminating a transparent protective plate, a polymer liquid layer, heat-generating layer, an insulating layer, a substrate and the like, there can be used any known method.

The present invention will be further explained referring to the drawing illustrating preferred embodiments of the optical element according to the present invention.

Figure 7:
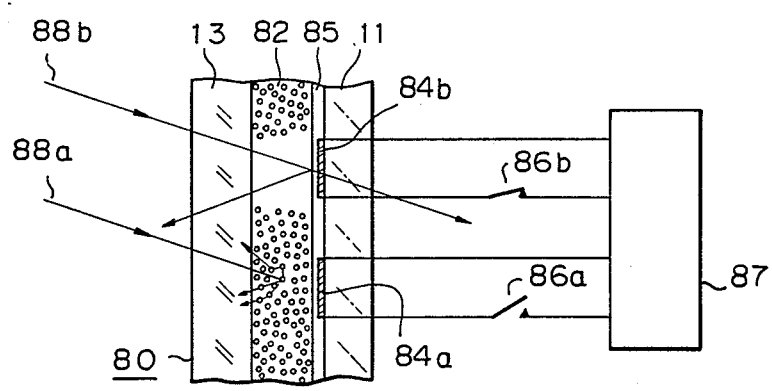
FIG. 7 shows a sectional view of an optical element of the present invention.
Figure 8:
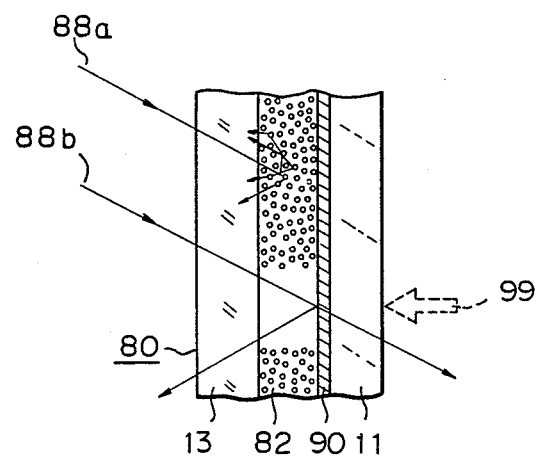
FIG. 8 shows another sectional view of an optical element of the present invention.

FIG. 7 shows diagrammatically a preferred optical element of a light transmission type a reflection type according to the present invention and FIG. 8 an another optical element according to the present invention.

In FIG. 7, an optical element 80 is constituted of the above-mentioned flexible substrate 11, polymer liquid layer 82 and flexible transparent protective plate 13. The above-mentioned substrate 11 is provided with resistive heat-generating layers 84a, 84b, . . . as a preferable means for heating a polymer liquid layer 82, and an insulating layer 85 for protecting these resistive heat-generating layers from a solvent in a polymer liquid layer. The resistive heat-generating layers are connected to an external power source 87 through switches or elements 86a, 86b . . . which act similarly to the switches.

In such an optical element of the present invention, in an opened state (86a) of the switch, no electric power is supplied to resistive heat generating layer 84a and the polymer liquid layer 82 adjacent thereto is at a low temperature, whereby the layer 82 is heterogeneous due to the phase separation of the polymer and the liquid, so that the incident light 88 is scattered remarkably in polymer liquid layer 82.

On the other hand, in an closed state (86b) of the switch, electric power is supplied to resistive heat-generating layer 84b by external power source 87 and the layer 84b generates heat, whereby temperature of the polymer liquid layer 82 is raised.

As the result, when the temperature of the liquid solution exceeds the critical solution temperature of the polymer, the polymer dissolved in the liquid medium to make the polymer liquid layer 82 transparent. Accordingly, in a transparent type of the element, the incident light travels straight and emitted from the back side of the element without being changed, while in a reflective type of the element the incident light will be reflected or absorbed according to the optical properties of the heat-generating resistance layer 84a, 84b, etc., insulating layer 85, colored layer (not shown) and so on. Thus, desired light modulation and display are achieved.

FIG. 8 shows schematically an embodiment that an infrared-ray-absorbing layer 90 in place of resistive layers 84a, 84b . . . of the embodiment in FIG. 7 is provided as a heating means on a surface of the substrate, the layer 90 absorbing infrared-ray 89 to generate heat. A working principle in this embodiment is the same as in FIG. 7 except for utilizing infrared-ray for an electric heating source. According to this embodiment, it is similarly effective that a side of the transparent protective plate is irradiated with infrared ray in a form of a pattern.

Furthermore, substituting for the heating means in FIGS. 7 and 8, there can be used a variety of pigments which absorbs light having specific wavelength to generate heat, and ultraviolet-ray-absorbing agent which absorbs ultraviolet ray to generate heat. They can be previously added to a polymer liquid layer 82, and thus light not absorbed by these light-absorbing heat-generating agent can be utilized simultaneously. Although such an embodiment is not shown, it is evident that a variety of optical displays and light modulation can be achieved.

Examples of the present invention are illustrated according to the Figures.

EXAMPLE 1

As a substrate 11 and a transparent protective plate 13, there was used a sufficiently cleaned glass of 0.3 mm thick and 50 mm×10 mm in size for each. The two glass plates were faced to each other at a distance of 10 μm using a Mylar film as a spacer and adhered to for a cell.

Isobutyl methacrylate polymer 5 g (manufactured by Tokyo Kasei) was dissolved in hot ethanol 50 ml to form a polymer solution.

The resulting polymer solution was charged in the cell followed by sealing. Thus an optical modulation liquid layer 12 was formed. Thus an optical element was produced.

The resulting optical element was irradiated in a manner of scanning with a semiconductor laser beam of output of 20 mW and wavelength of 830 nm in accordance with information signals. The laser beam was focussed on the optical modulation liquid layer 12 from the back side of the optical element. As a result, a predetermined portion of optical modulation liquid layer 12 turned from opaque into transparent. It is considered that the semiconductor laser beam was absorbed at the irradiated region of the optical modulation liquid layer 12 and converted to heat.

The heating by the semiconductor laser beam was effected only in a moment, and then the optical modulation liquid layer 12 immediately returned to an opaque state.

The above-mentioned irradiation experiment by the laser beam was repeated and it was found that the reproducibility and signal response were practically satisfactory.

EXAMPLE 2

Methacrylamide 0.5 g, and ammonium persulfate 10 mg were dissolved in 30 ml of a cold water, and then tetramethylethylenediamine 30 μl was added followed by deaerating by an aspirator.

The resulting solution was polymerized by standing for 30 min. at room temperature to form a polymer solution. An optical element was produced in a manner similar to the procedures in Example 1 except for using this soluble polymer for an optical modulation liquid layer.

The resulting optical element was subjected to imaging and light modulation as in Example 1 and there was obtained a good result similar to that in Example 1.

EXAMPLE 3

Polyethylene oxide (average molecular weight 1000, supplied by Wako Junyaku) 2.0 g was dissolved in 25 ml of isopropylacetone at 70° C. to form a polymer solution. An optical element was produced in a manner similar to in Example 1 except for using this soluble polymer for an optical modulation liquid layer.

The resulting optical element was subjected to an experiment of imaging and light modulation as in Example 1, and there was obtained a similar good result.

In the above-mentioned examples, optical elements of transparent type are explained, but optical elements of reflection type also can give characteristics similar to those of transparent type.

Since the optical element according to the present invention is excellent in scattering characteristics, there can be obtained clear images of high contrast and high resolution, and limitation of visual field angle can be eliminated. Therefore, even when the optical element is used as a display device for a long time, fatigue of eye is not caused. Further, the polymer liquid layer is modulated by a slight heating, and therefore, the power consumption of the display device can be saved. Further, high frequency modulation is possible.

EXAMPLE 4

FIG. 2 schematically shows the constitution of an embodiment the present invention. In FIG. 2, as substrate 11 and transparent protective plate 13, sufficiently cleaned glass plates each of which is 0.3 mm in thickness and 50 mm×10 mm in size were used. A Gd.Tb.Fe (gadolinium . terbium . iron) layer of 1500 Å thick was formed on the surface of the glass plate of substrate 11 by sputtering to produce an infrared ray absorbing layer 28. The surface of infrared absorbing layer 28 of substrate 11 and the transparent protective plate 13 were placed to face each other at a distance of 10 μm using a Mylar film as a spacer and adhered. Then, isobutylmethacrylate polymer 5 g (supplied by Tokyo Kasei) was dissolved in hot ethanol 50 ml to form a polymer solution.

The resulting polymer solution was charged in the space between substrate 11 and transparent protective plate 13 and sealed to form an optical modulation liquid layer 12. Thus an optical element was produced.

The resulting optical element was irradiated in a manner of scanning with a semiconductor laser beam of output of 20 mW and wavelength of 830 nm in accordance with information signals. The laser beam was focussed on the infrared ray absorbing layer 28 from the back side of the optical element. As a result, a predetermined portion of optical modulation liquid layer 12 turned from opaque into transparent. This is considered that the semiconductor laser beam was absorbed at the irradiated region of the optical modulation liquid layer 12 and converted to heat, and then a polymer liquid portion contacting the irradiated portion is heated. The heating by the semiconductor laser beam was effected only in a moment and then the optical modulation liquid layer 12 immediately returned to a opaque state.

The above-mentioned irradiation experiment by the laser beam was repeated and it was found that the reproducibility and signal response were practically satisfactory.

EXAMPLE 5

Methacrylamide 0.5 g, and ammonium persulfate 10 mg were dissolved in 30 ml of a cold water, and then tetramethylethylenediamine 30 μl was added followed by deaerating by an aspirator. After standing for 30 min. at room temperature, to the mixture was added methanol 25 ml. Then the mixture was heated to 60° C. to form a polymer solution. The resulting solution was used as a polymer solution in a manner similar to the procedures in Example 4 above to produce an optical element.

The resulting optical element was subjected to imaging and light modulation as in Example 4 and there was obtained a good result similar to that in Example 4.

EXAMPLE 6

Figure 3:
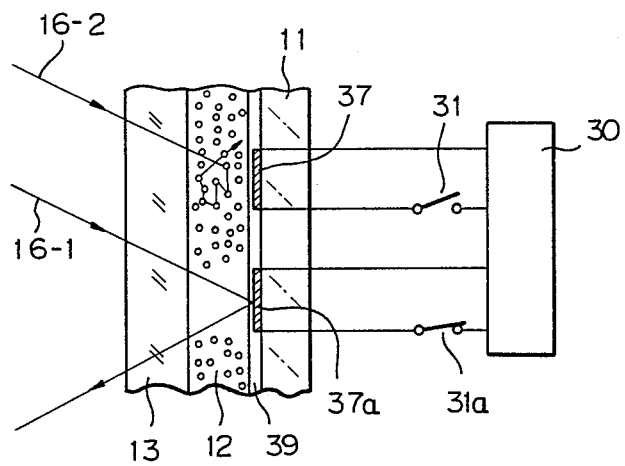

FIG. 3 shows schematically a further embodiment of the present invention. In this Example 6, as a heat generating element, a resistive heater layer 37 was provided on the surface of substrate 11 in place of an infrared ray absorbing layer 28 used in Examples 4 and 5, and heating of the resistive heater layer 37 was controlled by the electric current from power source 30. This Example 6 is concerned with a reflection type.

As the material for resistive heater layer 27, there may be used, for example, metal compounds such as hafnium boride, tantalum nitride and the like, alloys such as nichrome and the like, transparent oxides such as ITO (Indium Tin Oxide) and the like. The thickness of resistive heater layer is preferably 500–5000 Å. An insulating layer (protective layer) 39 is formed on the surface of resistive heater layer 37 and between optical modulation liquid layer 12 and resistive heater layer 37.

Referring to FIG. 3, a switch 31 connected with a resistive heater 37 is off so that electric current does not flow to the resistive heater layer 37. Thus, the incident light 16-2 is scattered as mentioned above.

On the other hand, a switch 31a connected with resistive heater layer 37a is on so that resistive heater layer 37a is heated with electric current from a power source 30. Therefore, the incident light 16-2 substantially passes an optical modulation liquid layer 12 as it is and then is normally reflected on the surface of the resistive heater layer 37a and passes optical modulation liquid layer 12 again and goes out of a transparent protective plate 13.

As mentioned above, when resistive heater layer 37 is used as a heat generating element in place of infrared ray absorbing layer 28, the effect is the same as that when infrared ray absorption layer 28 is used, and therefore the element using resistive heater layer 37 can be used as an optical element to effect imaging and light modulation.

Figure 4:
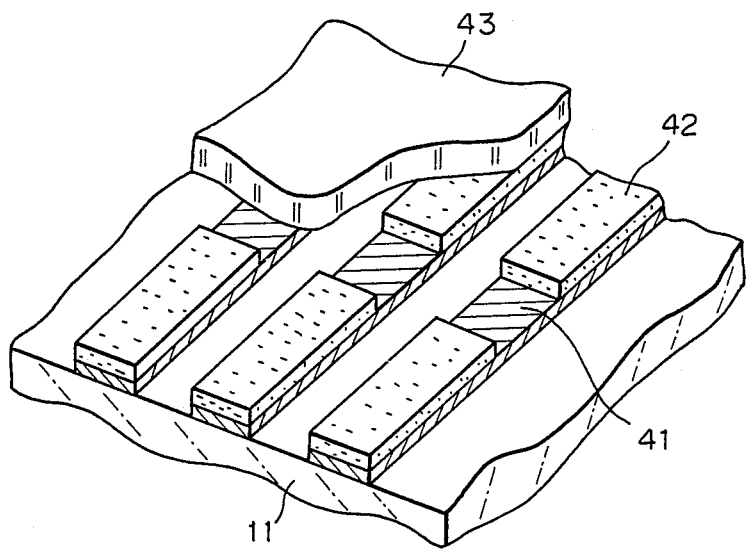

Referring to FIG. 4, an oblique view of a further example of the substrate of the present invention is shown. In this example, substrate 11 and transparent protective plate 13 are the same as those used in Example 4.

In FIG. 4, on the surface of substrate 11 was formed a tantalum nitride film of 1000 Å thick by sputtering, and then a photoresist was applied to the film surface to form 20 lines / mm of stripe-like pattern parallel to the short side (10 mm) of substrate 11. Then, unnecessary tantalum nitride film was selectively removed by etching and the remaining portions were used as resistive heater layer 41. An ITO film of 2000 Å thick was formed on the resistive heater layer 41 by sputtering, and a similar treatment was effected for patterning to produce electrode layers 42 of stripe type as shown in FIG. 4. Further a part of ITO on the resistive heater layer was removed so as to obtain a heat generating portion (40 μm × 26 μm).

Then, an $SiO_2$ film of 2 μm thick was formed thereon by sputtering as an insulating layer 43, but both end portions of the resistive heater layer 41 were masked so as not to form an $SiO_2$ film thereon since it is necessary to connect with lead wires. The substrate 11 provided with a resistive heater layer 41 and a transparent protective plate 13 were placed face to face using a Mylar film as a spacer at a distance of 10 μm and adhered to each other.

Then, polyethylene oxide (average molecular weight of 1000, Wako Junyaku) 2 g was dissolved in hot isopropylacetone 25 ml at 70° C. to form a polymer solution. This polymer solution was charged in the space between substrate 11 and transparent protective plate 13 and sealed. Thus an optical element was produced.

An electric pulse signal (pulse height of 20 V and pulse length of 5 m sec) of frequency of 1 KHz was inputted to an optional combination of resistive heater layer 41 of the resulting optical element in correspondence to an information signal, and a predetermined position corresponding to the information signal exhibits opaque to respond thereto and it was confirmed that writing corresponding to the information signal was possible.

As is clear from the above examples, the optical element according to the present invention can give good results in each of the transparent type and the reflection type.

According to the present invention, the optical element is so excellent in scattering characteristics that highly clear images of high contrast and high resolution can be obtained and the limitation as to the visual field angle can be eliminated. Therefore, even when the optical element is used for a display apparatus for a long time, fatigue of eye is not caused. Further, the polymer liquid layer is modulated by only slight heating so that the power consumption of the display apparatus can be saved. In addition, high frequency modulation is possible.

EXAMPLE 7

As each of a substrate 11 and a transparent protective plate 13, there was used a sufficiently cleaned glass plate of 0.3 mm thick, 50 mm × 10 mm in size, and the substrate 11 and the transparent protective plate 13 were disposed facing to each other with a Mylar film as a spacer at a distance of 10 μm and adhered to each other.

Then 5 grams of isobutyl methacrylate polymer (manufactured by Tokyo Kasei K.K.) was dissolved in 50 ml of hot ethanol, and further IRG-003 was added thereto in an amount to give a concentration of 0.001% by weight. This polymer solution was cooled to give a polymer emulsion, and was filled and sealed in the gap between the substrate 11 and the transparent protective plate, forming the polymer emulsion layer 12, whereby a deposited optical element of the present invention illustrated in FIG. 5 was obtained.

The above-mentioned optical element 60 was irradiated by scanning with a semiconductor laser beam 65 of output of 20 mW and wavelength of 830 nm from the back surface of optical element 60 in accordance with an information signal with focusing to a polymer emulsion layer 12, and it was observed that the irradiated region 66 in polymer emulsion layer 12 was immediately changed from a precipitated state to a homogeneous state.

It appears that the semiconductor laser beam 65 is absorbed at the irradiated region of polymer emulsion layer 12 and changed to heat and the polymer emulsion is heated by the heat. The heating time by the semiconductor laser beam 65 was only an instant, and when the irradiation was interrupted, the homogeneous portion returned to the original light scattering state. Thus, the thermal responsing property was very good.

When the irradiation experiment by the abovementioned laser beam 65 was repeated, it was found that the reproducibility and signal responsing property is practically sufficient.

EXAMPLE 8

Methacrylamide 0.5 g, and ammonium persulfate 10 mg were dissolved in 30 ml of a cold water and then tetramethylethylenediamine 30 μl and 1 RG-300 (0.001 % by weight) were added followed by deaerating by an aspirator. After standing for 30 min. at room temperature, to the mixture was added methanol 25 ml. Then the mixture was heated to 60° C. to form a polymer solution. The resulting solution was used as a polymer solution in a manner similar to the procedures in Example 7 above to produce an optical element.

The resulting optical element was subjected to imaging and light modulation as in Example 7.

EXAMPLE 9

A substrate 11 constituted of an aluminum vapor-deposited layer of 1,000 Å thick and a polyethylene protective layer produced by plasma polymerization of 1,000 Å thick overlying the aluminum vapordeposited layer was used, and as a transparent protective plate 3, a sufficiently cleaned glass plate of 0.3 mm thick and 50 mm × 10 mm in size was used.

Then 2 grams of polyethylene oxide (average molecular weight: 1000, manufactured by Wako Junyaku) was dissolved in 25 ml of isopropylacetone, and thereto IRG-003 was added in an amount to give a concentration of 0.002 % by weight to obtain a polymer emulsion. A reflective type of optical element of the present invention as shown in FIG. 6 was prepared in the same manner as in Example 7 except that this emulsion was used.

With respect to the resulting optical element 60, reflection light was measured by the same method as in Example 7. The result was as good as that in Example 7.

EXAMPLE 10

A substrate was produced in a manner similar to that in Example 9.

Then, polyethylene oxide 2 g (average molecular weight of 1,000, supplied by Wako Junyaku) was dissolved in isopropylacetone 25 ml, and thereto the abovementioned formula (1), an infrared sensitive pigment, was added in an amount to give 0.003 % by weight to obtain a polymer solution.

Thus, an optical element of the present invention was prepared in the same manner as in Example 7. The optical element showed the same performance as in Example 9.

EXAMPLE 11-14

Repeating the procedure of Example 7 except that each of IR absorbers of the above-mentioned formulas (1)-(5) was used in place of IRG-300 in Example 7 in the same concentration, each of the optical elements of the present invention was produced. These optical elements exhibited excellent performance similar to that in Example 7.

As shown in each of the above examples, the optical element according to the present invention exhibits good performance in both transmission type and reflection type.

As described above, the optical element according to the present invention is excellent in light scattering characteristics corresponding to an information signal, and therefore, there can be formed clear images of high contrast and high resolution, and limitation to the visual field angle can be eliminated. Thus, in the case of using the optical element of the present invention as a display apparatus, the user does not suffer an eye fatigue even when the display apparatus is operated for a long time. In addition, since the polymer gel layer is easily modulated by a small amount of heat, there is a large economical advantage that the power consumption of the display apparatus is a very little.

EXAMPLE 15

As shown in FIG. 4, a 1000 Å thick tantalum nitride film was formed by sputtering onto the surface of the Mylar film 11 (substrate) having a dimension of 50 mm × 50 mm and a thickness of 100 μm. A photo resist was applied onto the film. A stripe pattern of 20 line mm parallel to a side of the film was baked, and then unnecessary portion of the film was selectively removed by etching to give a desired pattern of resistance film 41. Further thereon, 2000 Å-thick indium-tin oxide (ITO) film was laminated by sputtering, and a patterning similar to that mentioned above was carried out to form an electroconductive path 42. The portion (40 μ × 2000 μ in size) of the tantalum nitride which is not covered by ITO is used as the heat generating resistance layer 41. Thereon ethyl methacrylate plasma treatment was carried out to form a crosslinked high molecular film of 80 μm as the insulating layer 43.

Onto this film, a Mylar film was adhered which has a thickness of 100 μm, a size of 50 mm × 30 mm having an opening of 40 mm × 10 mm at the central portion in such a manner that the heat generating resistance layer portion is inserted into the opening, and then the film was maintained on a hot plate of 70° C.

0.4 g of polyethylene oxide (average molecular weight of 1,000; supplied by Wako Junyaku) was dissolved in 5 ml of isopropylacetone by heating. The resulting solution was dropped onto the opening portion of the above-mentioned film kept at 70° C., which was then covered with a Mylar film of 50 mm × 30 mm in size and 100 μm in thickness, and the periphery portion of the film was sealed with a cold-setting epoxy resin. Thus an optical element of the present invention was prepared. An arbitrary combination of the heat generating resistance layer, in correspondence with information signals was applied with electric pulses of 800 Hz frequency and 35V peak height at a rate of 10 ms per one pulse. A change from opacity to transparency was occurred at the position corresponding to the information signal on the element. It was found that the optical correspondence can be obtained at a repeating cycle as short as 30 ms.

This element did not break at a bending of about 5 mm of curvature, and the corresponding characteristics deteriorate little even at a bending of more than 10 mm of curvature.

EXAMPLE 16

A Mylar film carrying a heat generating resistance layer was prepared in the same manner as in Example 15. Onto the film, a Mylar film of 100 $\mu$m thick and 500 mm $\times$ 30 mm in size having an opening of 40 mm $\times$ 10 mm at the central portion thereof was adhered in such a manner that the heat generating resistance portion be inserted into the opening.

0.4 g of isobutyl acrylate, 8 mg of ethylenedimethacrylate and 1.2 mg of azobisisobutyronitile were dissolved in 2.5 ml of ethanol. The solution was deaerated under a reduced pressure. This solution was dropped onto the above-mentioned opening portion of the adhered film, under nitrogen atmosphere and it is covered with a Mylar film of 50 mm $\times$ 30 mm in size and 100 $\mu$m in thickness in such a manner that air is not incorporated, then the periphery portion was sealed with a cold setting epoxy resin. The polymerization was carried out by keeping the resulting article in a thermostatic chamber at 65° C. for 8 hours.

A similar response to that in Example 15 was obtained when electric signals are input to the element in the same manner as in Example 15.

EXAMPLE 17

A Mylar film having a heat generating resistance layer was prepared in the same manner as in Example 15. Onto this film, a Mylar film was adhered which has a thickness of 100 $\mu$m, a size of 50 mm $\times$ 30 mm having an opening of 40 mm $\times$ 10 mm at the central portion in such a manner that the heat generating resistance layer portion is inserted into the opening, and then the film was maintained on a hot plate of 50° C.

0.5 g of acrylamide, 0.1 g of acrylic acid and 4 mg of ammonium persulfate were dissolved in 5 ml of cold water, and thereto 15 ml of tetramethylethylenediamine was added. The mixture was deaerated under reduced pressure. Polymerization was carried out by maintaining the mixture at 20° C. for 30 minutes on a water bath. To the resulting solution was added 6 ml of acetone, and the mixture was heated until precipitated polymeric materials were dissolved again.

This solution was dropped onto the above-mentioned opening portion of the Mylar film maintained at 50° C. which was then covered with a Mylar film of 50 mm $\times$ 30 mm in size and 100 $\mu$m in thickness in such a manner that air be not incorporated, then the periphery portion was sealed with a cold setting epoxy resin. Thus an optical element of the present invention was prepared.

A similar response to that in Example 15 was obtained when electric signals are input to the element in the same manner as in Example 15.

EXAMPLE 19

A Cd.Tb.Fe layer was formed to a thickness of 1500 Å on a surface of a Mylar film of 50 mm $\times$ 50 mm in size and 100 $\mu$m in thickness by spattering to prepare an infrared-ray-absorbing layer.

Onto this film, a Mylar film is adhered which has a thickness of 100 $\mu$m, a size of 50 mm $\times$ 30 mm having an opening of 40 mm $\times$ 10 mm at the central portion in such a manner that the heat generating resistance layer portion is inserted into the opening, and the film was heated on a hot plate maintained at 70° C.

0.4 g of polyethylene oxide (average molecular weight, 1000; supplied by Wako Junyaku) was dissolved by heating in 5 ml of isopropylacetone. The resulting portion of the above-mentioned film, which was then covered with a Mylar film of 50 mm $\times$ 30 mm in size and 100 $\mu$m in thickness, and the periphery portion of the film was sealed with a cold-setting epoxy resin. Thus an optical element of the present invention was prepared.

Opaque spots were formed corresponding the information signals on irradiation of a semiconductor beam (wave length: 833 nm, spot diameter: 50 um, output power: 20 mw) according to information signals from the side of transparent protection plate of the element. An image was formed on the element by scanning the beam.

This element did not break at a bending of about 5 mm of curvature, and the corresponding characteristics deteriorate little even at a state of bending of more than 10 mm of curvature.

The following effects are obtained according to the present invention:

(1) The element will not easily be destroyed by an impact since the element is flexible as a whole. Further, the operation even in a distorted state is possible.

(2) Mechanical designing is made easy for incorporation into devices in combination with the characteristics mentioned in (1), since it can be made into thin form.

(3) A definite output can be obtained, since the change of optical characteristics of the element is large in response to the input signals.

(4) The element gives a display device of which angle of visibility has no restriction, and hence observation is made easy.

(5) A polymer liquid layer is easily formed, and hence steps for preparation of the element is simplified.

As mentioned above, the light modulation apparatus of the present invention is constituted of a signal input portion, a light modulation element composed of the above-mentioned particular light modulation member, and a light receiving medium. The signal input portion, other members constituting the light modulation element and the light receiving medium may be those of known structures. In the following, referring to the drawing, preferable embodiments of the present invention of the light modulation apparatus some parts of which may be constituted of known structures as mentioned above will be explained more in detail.

Figure 9:
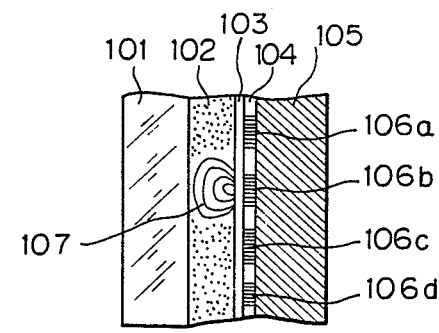
FIGS. 9 and 10 illustrate examples of optical modulation elements.

FIG. 9 shows an embodiment of a light modulation element for the light modulation apparatus according to the present invention. In FIG. 9, 101 is a transparent protective plate, 102 is an organic polymer emulsion thin layer, 103 is an insulating layer having thermal conductivity, 104 is a heat generating resistive member layer in which heat generating resistive members 106a, 106b, 106c, 106d ... are arranged, 105 is a support for an insulating layer 103 and heat generating resistive members (106a, 106b ... ). When the heat generating resistive members generate heat, the heat is transferred to the insulating layer 103 and then to the organic polymer emulsion thin layer 102 to form a transparent portion 107 in the organic polymer emulsion thin layer 102.

For example, as shown in FIG. 9, when heat generating resistive member 106b is selected to generate heat, the heat is transferred to organic polymer emulsion thin layer 102 through insulating layer 103 adjacent to heat generating resistive member 106b, and then heats the organic polymer emulsion at the region of the organic polymer emulsion thin layer 102 facing the heat generating resistive member 106b, and a transparent portion 107 is formed at that region.

As a predetermined period of time lapses, the transparent portion 107 disappears as the organic polymer emulsion at this region is cooled. This one cycle of formation and disappearing of the transparent portion 107 is a very short time and it can be effected on the order of KHz.

The above-mentioned heat generating resistive member (106a, 106b . . . ) can be formed on support 105 by I.C. fabricating technique, and the distance between the adjacent heat generating resistive members (106a, 106b . . . ) can be made on the order of $\mu$m.

In this way, as a light modulation member deforming the wave surface of an incident light, an organic polymer emulsion is used and therefore, it is not necessary to pay a special attention to a polarized light, different from the case of crystal in conventional technique.

In the prior art, it is necessary that the light flux is propagated in the direction parallel to the electrode surface or heater surface, but in the present invention this is not necessary, that is, the light flux may be incident on the heater surface at a right angle or other angle and therefore, there is not such a limitation as above with respect to arrangement upon assembling light modulation elements to fabricate a light modulation apparatus.

Figure 10:
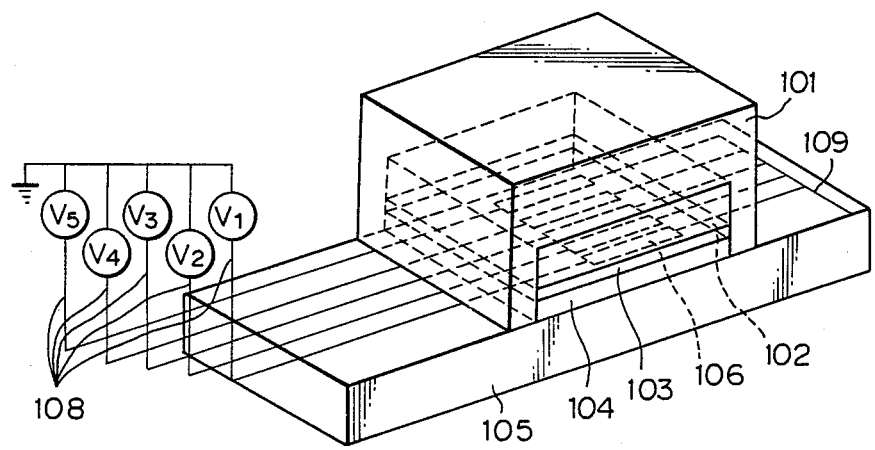

FIG. 10 is an oblique view showing the constitution of the light modulation element in FIG. 9 and the reference numerals 101–106 are the same as those in FIG. 9. 108 is leading wires constituting a signal input portion and is connected to each distinct driving voltages so as to drive independently each of heat generating resistive members 106a, 106b, . . . The other end of the heat generating resistive member (106a, 106b, . . . ) is grounded or set to a common voltage. Voltage signals are applied to respective heat generating resistive members (106a, 106b, . . . ) from lead wires 108, and then transparent portion 107 is formed in organic polymer emulsion thin layer 102 adjacent to each heat generating resistive member (106a, 106b, . . . ). The transparent portion 107 is cooled and returns to the original white turbid state when the voltage signal is made zero.

Figure 11A:
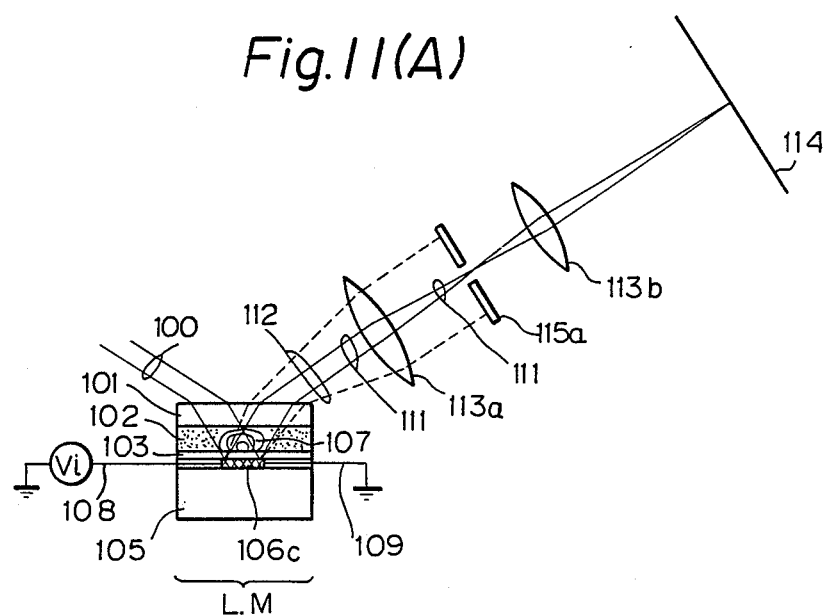
FIGS. 11(A) and 11(B) each shows an example of a light modulation device of the present invention.

FIG. 11(A) shows an embodiment of light modulation apparatus using a light modulation element L.M. by the above-mentioned light scattering and an example where the light flux whose wave surface is not deformed by light scattering is used as an information light.

When a light flux 100 is incident on the light modulation element L.M. and an optionally selected heat generating resistive member 106c among the heat generating resistive members (106a, 106b, . . . ) is driven by voltage Vi, a transparent portion 107 is formed and the light flux incident on the heat generating resistive member 106c goes out as a light flux 702 whose wave surface is not deformed.

A light flux 111 is condensed by a lens 113a, and an aperture with which a light shading plate 115a is provided is located in a condensed position of the light flux, whereby the light flux 111 passes through the light shading plate 115.

Most of a light flux 112 whose wave surface has been deformed by a white turbid state before driving a heat-generating member is shaded by the shading plate 115a.

The light flux 702 whose wave surface has been deformed by a white turbid state before driving heat-generating member is partly shaded by the shading filter 115b. However, by making the size of shading filter 115b the minimum size which shades the image formation spot of the light flux 100 whose wave surface has not been deformed, it is possible to project most of the wave surface deformed light flux 112 onto a light receiving medium 114. By making a point on the heat generating resistive member and a point on the light receiving medium 114 conjugate by the lens 113a, an image at the portion where a light scattering is generated contiguous to the heat generating resistive member can be formed on a light receiving medium 114 as a spot.

According to the present invention, since a material capable of making the degree of light scattering drastic can be freely selected as a thermal effect light modulation member and the divergent angle of a light flux caused by the white turbidity is larger than the diffraction angle when the above-mentioned electrooptical crystal is used, even when the same size of a shading filter 115a is used, the rate of the divergent light shaded is very small in the present invention.

As mentioned above, when a voltage pulse corresponding to an input signal is added to a heat generating resistive member 106c through a lead wire 108 or is made zero, the formation and elimination of the white turbid portion 107 are repeated.

At that case, a light spot comes on or off on the light receiving medium 114.

Thus, most of the divergent light by light scattering is shaded by shading filter 115a, and only the light flux 101 not subjected to deformation of wave surface mainly passes the shading filter 115a. By providing a lens 113a making conjugate the relation between the image formation spot by a lens 113a or the shading filter 115a and the light receiving medium 114, a light spot comes on or off at the light receiving medium.

Figure 11B:
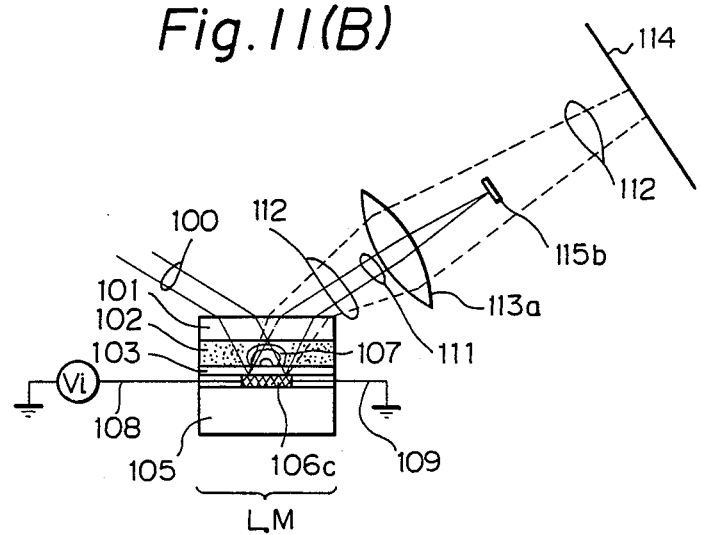

FIG. 11(B) shows an embodiment of light modulation apparatus using a light modulation element L.M. by the above-mentioned light scattering and an example where the light flux whose wave surface is deformed by light scattering is used as an information light.

When a light flux 100 is incident on the light modulation element L.M. and an optionally selected heat generating resistive member 106c among the heat generating resistive members (106a, 106b, . . . ) is driven by voltage Vi, a transparent portion 107 is formed and the light flux incident on the heat generating resistive member 106c goes out as a light flux 111 whose wave surface is not deformed.

A light flux 100 forms image by a lens 113a and is subjected to shading by a shading filter 115a *disposed at the image formation position.*

The light flux 112 whose wave surface has been deformed due to a white turbid state before driving of a heat-generating resistive member is partly shaded by the shading filter 115b. However, by making the size of shading filter 115b the minimum size which shades the image formation spot of the light flux 111 whose wave surface has not been deformed, it is possible to project most of the wave surface deformed light flux 112 onto a light receiving medium 114. By making a point on the heating generating resistive member and a point on the light receiving medium 114 conjugate by the lens 113a, an image at the portion where a light scattering is generated contiguous to the heat generating resistive member can be formed on a light receiving medium 114 as a spot.

According to the present invention, since a material capable of making the degree of light scattering drastic can be freely selected as a thermal effect light modulation member and the divergent angle of a light flux caused by the white turbid is larger than the diffraction angle when the above-mentioned electrooptical crystal is used, even when the same size of a shading filter 115b is used, the rate of the divergent light shaded is very small in the present invention.

As mentioned above, when a voltage pulse corresponding to an input signal is added to a heat generating resistive member 106c through a lead wire 108 or is made zero, the formation and elimination of the transparent portion 107 are repeated.

FIG. 12 shows a state of light flux incident on a light modulation element L.M. which improves the contrast of coming on and off of light at the light receiving medium 114, that is, optimizing the light utilization efficiency.

FIG. 12 A is a view of a light modulation element L.M. in the direction of arrangement of the heat generating resistive member, and FIG. 12 B is a view of the light modulation element L.M. in the direction perpendicular to the direction of arrangement of the heat generating resistive member.

The nearer to the heat generating resistive member, the larger the degree of transparency. When a light flux 116 is concentratedly incident thereon, the efficiency of normal reflectance becomes the highest.

Depending on the roughness or degree of planeness of the surface of support 105, heat generating resistive members (106a, 106b, . . . ), or insulating layer 105, the shading efficiency of shading filter 115a in FIG. 11(B) becomes lower as to the light flux other than that of divergent light produced by light scattering, and therefore a noise light is projected on light receiving medium 114.

This noise light is projected on light receiving medium 114 regardless of input signal voltage pulse series Vi applied by lead wire 58, and therefore, the contrast is lowered. Similarly in FIG. 11(A), the transmission efficiency becomes lower, and therefore, the contrast is lowered. In order to eliminate such drawbacks, it is desired to converge, in a form of line, the input light flux 116 at a region contiguous to the heat generating resistive members, as shown in FIG. 12 (A).

117 is a normal reflection light flux (not diverged by light scattering) of incident light flux 116 and a broken line 118 shows a divergent light flux caused by light scattering.

Figure 12A:
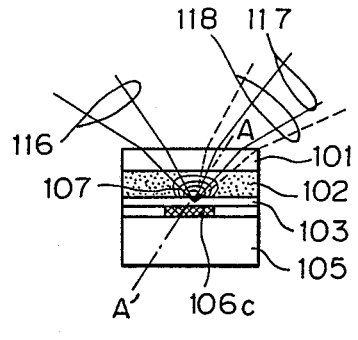
FIGS. 12(A) and 12(B) illustrate preferable examples of a light modulation devices of the present invention.
Figure 12B:
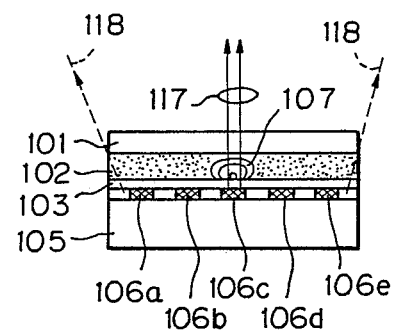

FIG. 12(B) is a cross-sectional view taken along A-A' in FIG. 12(A). 117 is a normal reflection light flux caused by a transparent portion 107 generated at a $ portion contiguous to a portion of heat generating resistive member 116c to which an image signal is inputted, and 708 is a divergent light flux caused by a white turbid portion and is scattered to a direction different from the normal reflection light flux 117.

Figure 13:
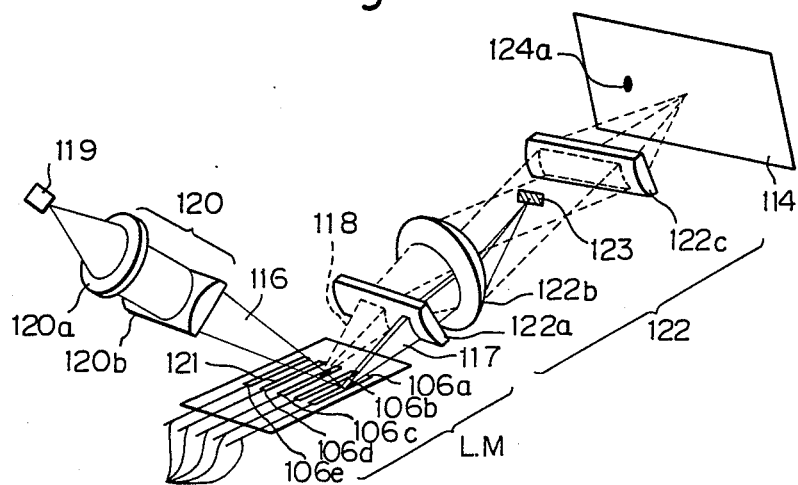
FIGS. 13 and 14 illustrate other examples of optical modulation elements employed in the present invention.

FIG. 13 shows an arrangement of an example of a light modulation apparatus of the present invention which exhibits a enhanced light utilization efficiency and a good contrast of coming on and off of light at the light receiving medium 114 as explained in FIG. 12.

In this example, a light flux emitted from a light source 119 such as a semiconductor laser or a light emitting diode forms an image in a form of line in the direction of arrangement of heat generating resistive members (106a, 106b, . . . ) of the light modulation element L.M. by an line image forming optical system 120 constituted of a spherical lens 120a and an anamorphic lens 120b.

The light flux in a plane perpendicular to the direction of arrangement of heat generating resistive members converges on the heat generating resistive member, but the light flux in the direction of arrangement is in a state of parallel light flux.

Therefore, a light flux 117 not diverged at the heat generating resistive member forms a light path in a form of trigonal prism and is incident on a positive cylindrical lens 122a. The cylindrical lens 122a is provided such that it has a generatrix in the direction of arrangement of heat generating resistive members and the focus line surface consists with the position of heat generating resistive members.

Consequently, light flux 117 passes through cylindrical lens 712a and then becomes a focal light flux and is incident on spherical lens 122b. By spherical lens 122b, the light flux 117 is condensed on the focal surface of the lens. On the focal surface is provided a rectangular filter 123 sufficient to shade the light flux 123, and therefore, a light flux which is not diverged by the heat generating resistive member is shaded by the filter 123.

On the other hand, among the light flux 118 diverged by the heat generating resistive member, only the light flux in the plane perpendicular to the direction of arrangement of the heat generating resistive members becomes a parallel light by a cylindrical lens 122a, and further the light forms an image at a portion contiguous to the rectangular filter 123 by the spherical lens 122b.

Therefore, a part of divergent light flux 118 is shaded by rectangular filter 123, but most of the light flux is not intercepted by shading filter 115, but is incident on a positive cylindrical lens 122c having a generatrix in the same direction as that of the cylindrical lens 122a, and forms an image on a light receiving medium 114. Accordingly, dark spot images are formed at a point 124a conjugated with a heatgenerating resistive member 106a not diverged.

Filter 123 and light receiving medium 114 are located at a focal line surface optically conjugate with respect to cylindrical lens 122c, and the heat generating resistive heater and light receiving medium 114 are optically conjugate with respect to the spherical lens system 122b.

By another expression, with respect to an anamorphic lens system 122 constituted of cylindrical lenses 122a and 122c and spherical lens system 122b, the heat generating resistive members (106a, 106b, . . . ) and light receiving medium 114 are located in an optically conjugate focal line surface in a plane perpendicular to the direction of arrangement of heat generating resistive members. And in the plane defined by the optical axis of anamorphic lens system 122 and the direction of arrangement of heat generating resistive members, the light receiving medium 114 is present on the focal line surface of the anamorphic lens system 122. In FIG. 13, there is shown only the heat generating resistive members as to the light modulation element L.M.

Figure 14:
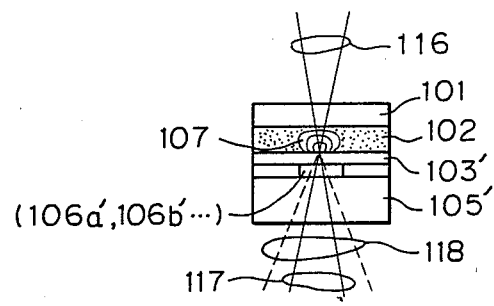

In the above-mentioned example, the heat generating resistive members are constituted of a reflecting member and both the divergent light flux and light flux not diverged are reflected by the heat generating resistive members, and in FIG. 14 all light fluxes pass through the light modulation element.

The construction of the light modulation element itself shown in FIG. 14 is the same as that in FIG. 10, but a support 105', heat generating resistive members (106a', 106b', ...) and an insulating layer 103' are constituted of transparent media. Also in this case, a sufficient practical effect can be obtained by using the above-mentioned optical system.

Figure 15A:
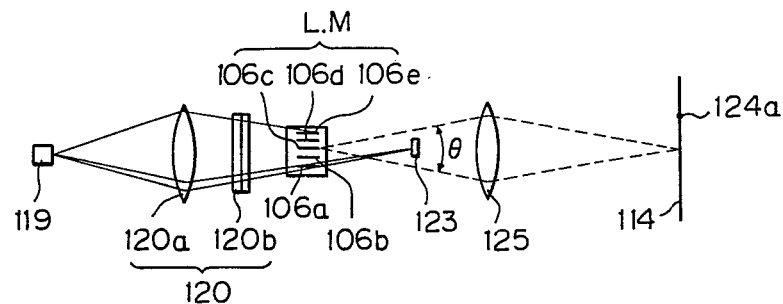
FIGS. 15(A) and 15(B) illustrate examples of optical modulation devices of the present invention.

FIG. 15(A) and (B) show an example of a light modulation apparatus, and a line-like image is formed in the direction of arrangement of heat generating resistive members (106a, 106b, ...) in a light modulation element L.M. in a manner similar to the optical system in FIG. 13.

Figure 15B:
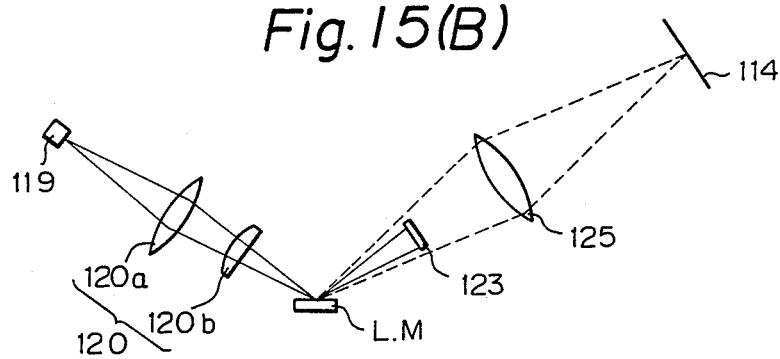

FIG. 15(A) is a view from the direction perpendicular to the line image. FIG. 15(B) is a side view of FIG. 15(A). The difference from the optical system in FIG. 13 reside in that the light flux emitted from the light source is condensed by a lens 120a, and, as shown in FIG. 15(A), a conjugate image of the light source is formed between the light modulation element L.M. and a lens 125, and further as shown in FIG. 15(B), a line-like image is formed near to heat generating resistive members of the light modulation element L.M. by a line forming optical system 120 composed of a lens 710a and an anamorphic lens 120b.

In FIG. 15(A), a shading filter 123 in a form of rectangle having a long side in the direction perpendicular to the direction of arrangement of heat generating resistive members (106a, 106b, ...) is placed at a conjugate image position as to the light source, and therefore, a light flux not diverged is shaded while a light flux diverged by light scattering passes the outside of shading filter 123 and is incident on a lens 125 with respect to which heat generating resistive members (56a, 56b, ...) and a light receiving medium 704 are at a conjugate relation, and is formed on the light receiving medium 704. By arranging the system as mentioned above, as optical system as shown in FIG. 13 can be simplified.

Figure 16:
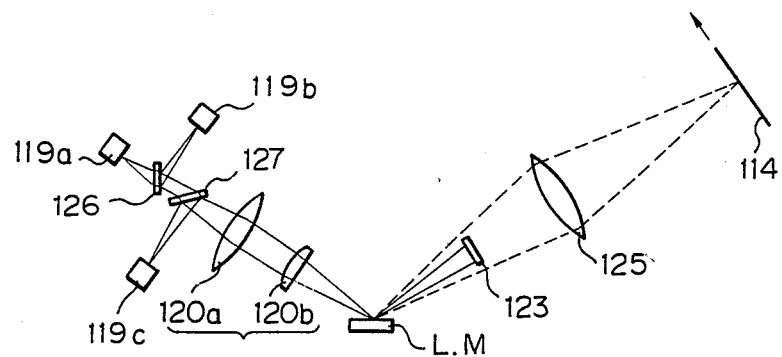
FIGS. 16 and 17 illustrate examples of a modulation apparatus for color image forming light.

FIG. 16 shows an example of a light modulation apparatus for producing color images according to the present invention. Light source 119a is a red LED (light emitting diode), 119b a green LED, and 709c a blue LED, and 126 is a dichroic mirror allowing a red wavelength zone to pass and reflecting a green wavelength zone and 127 is a dichroic mirror allowing to pass lights other than a light of a blue wavelength zone and reflecting a blue wavelength zone, and a light flux from each light source reaches heat generating resistive members of the light modulation element L.M. Other structures are the same as those of the optical system as shown in FIG. 15.

It is possible to form color images on light receiving medium 114 by using such light sources of three colors and a light modulation element.

Figure 17:
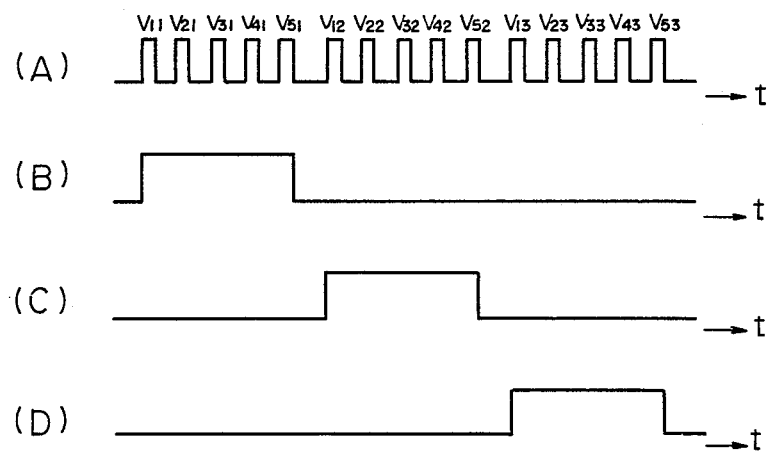

FIG. 17 shows a system of the color image generating device as shown in FIG. 16, and FIG. 17(A) shows a series of voltage pulses inputted to heat generating resistive members (106a, 106b ...) of the light modulation element L.M. V1i, V2i, ... V6i (i=1-3) are voltage pulses applied to the above-mentioned heat generating resistive members (106a, 106b ... 106e), respectively, and (i=1-3) indicates the number of the cycle. FIG. 17(B) shows an electric current signal pulse inputted to the LED 119a, and LED 119a emits light during the period that the above-mentioned voltage pulse series V11, V21...V51 are generated. FIG. 17(C) shows as electric current signal pulse inputted to LED 119b, and the LED emits light during the period that the above-mentioned voltage pulse series V12, V22 ... V52 are generated. FIG. 17(D) shows that LED 119c emits light while the voltage pulse series V13, V23 ... V53 are generated.

In FIGS. 17(A), (B), (C), and (D), the abscissa is a time, and the above-mentioned signal pulse is generated periodically in the previous time zone (not shown). As shown in FIG. 16, when the light receiving medium 114 moves to the direction as shown by an arrow, there are formed, on the surface of the light receiving member, red, green and blue spots aligned in the direction of the arrow, that is, in the direction of movement of the light receiving medium. By forming one picture element using the three spots, there can be effected color display.

In FIG. 17(A), voltage pulses are inputted to all heat generating resistive members at the same interval, but if voltage pulses are generated corresponding to image signals, optional color images can be formed on the light receiving medium 114. As mentioned above, according to the present invention, it is not necessary to have particularly a polarized light characteristic, and light sources having different wavelengths can be used.

Figure 18:
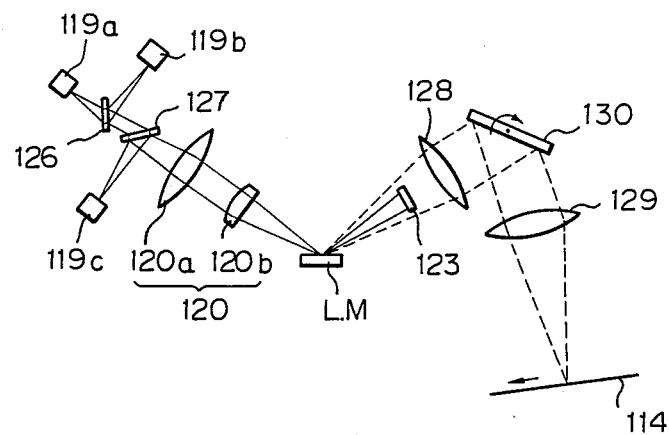
FIGS. 18 and 19 illustrate another examples of a modulation apparatus for color image forming light.

FIG. 18 is an application example of an apparatus shown in FIG. 16, and a color image shown in FIG. 16 is formed by using a deflecting device 130 and scanning the whole surface of a light receiving medium 114 with a scanning spot.

If a photosensitive recording material such as silver salt film is selected as the light receiving medium, a digital color printer can be realized. Or, if a light diffusion screen is used as a light receiving medium, color display can be conducted.

According to the present invention, the light extinguishing ratio of the signal light scattering light is high, and in addition, since the divergent efficiency is high, luminance of the image formation spot light on the light receiving medium can be made high, and the above-mentioned digital color printer or color display can be realized. Needless to say, in digital color printers and displays, the light source may be one, that is, monochromic printers or monochromic display.

In the examples shown in FIG. 13–FIG. 18, an optical system shading non-divergent light, but needless to say, an optical system shading divergent light may be used as well, as shown in FIG. 11(A).

Figure 19:
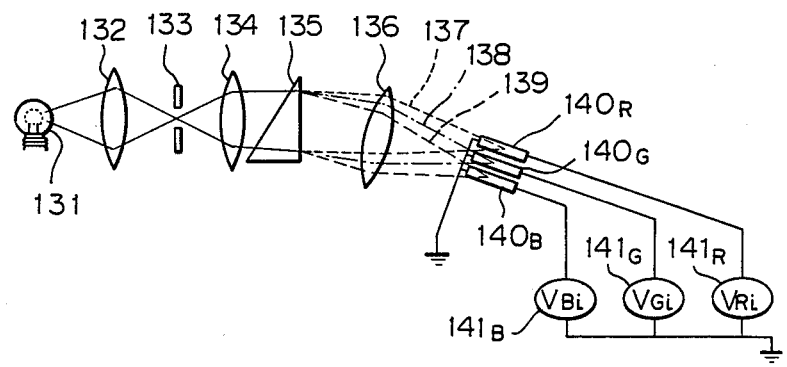

FIG. 19 shows a further example of a light modulation apparatus for producing color images according to the present invention.

In FIG. 19, a light source 131 is an originary white light lamp such as halogen lamp, lens 132 is a condensing lens, 133 is a pinhole plate for limiting the secondary light source image, 134 a collimator lens, 135 a prism causing the color dispersion, 136 a convergent lens, and 140R, 140G and 140B are heat generating resistive members for generating red, green and blue scattered lights as color signals, and are connected to voltage impressing means 141R, 141G and 140B generating voltage pulses independently corresponding to the input signals, respectively. Here, for simplifying the explanation, details of the light modulation element are not shown, but are the same as those in FIG. 10 except for the above-mentioned heat generating resistive member portion.

In the above-mentioned example, focussed light images of a red light flux, a green light flux and a blue light flux are formed on heat generating resistive members 140R, 140G and 140B, respectively, by a color dispersion prism 135 and a lens 136, and each color signal light can be modulated corresponding to image signal.

Further, in FIG. 19, a cylindrical lens having a generatrix perpendicular to the paper is used in place of the lens 136 so that a red light flux, a green light flux and a blue light flux form images in a form of line. The line-like fluxes corresponding to these colors are formed in parallel at a small distance. Therefore, the above-mentioned heat generating resistive members 140R, 140G and 140B are made one unit, and a plurality of the units are arranged along the direction of the line-like image to form a plurality of color picture element series. When a diffraction grating is used in place of a prism as a light flux dispersion means in FIG. 15, the same effect can be obtained.

Figure 20A:
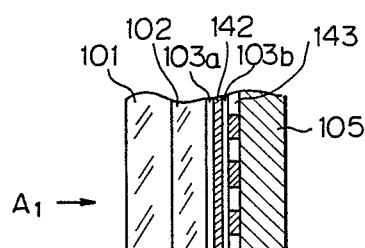
FIGS. 20(A) and 20(B) each illustrates an examples of a light modulation element of the present invention.
Figure 20B:
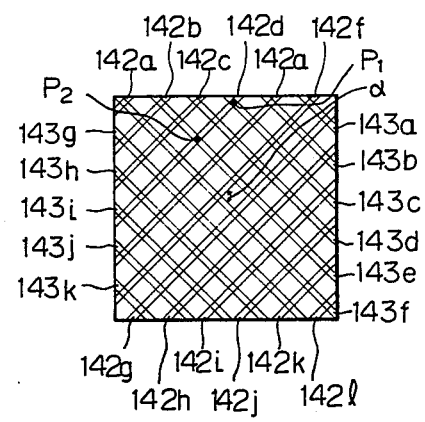

FIG. 20 shows a light modulation element capable of generating light scattering in row and column. FIG. 20(A) is a side view of a light modulation element and FIG. 20(B) is a front view of the light modulation element, that is, the state of arrangement of heat generating resistive layer when FIG. 20(A) is viewed in the direction of arrow A.

In FIG. 20(A), a transparent protective plate 101, an organic polymer emulsion thin layer 102 and a support 55 are the same as those of the light modulation element in FIG. 9. 103a and 103b are thermally conductive insulating layers. Each of 142 and 143 is heat generating resistive member layers composed of a plurality of line-like heat generating resistive members arranges parallel to each other at the same distance, and as shown in FIG. 20(B), resistive members (142a–142l) of the heat generating resistive member layer 142 and resistive member (143a–143l) of the heat generating resistive member layer 143 are arranged such that they cross each other at an angle α.

The light modulation element of FIG. 20 is designed such that when a voltage is impressed to both resistive members crossing each other, the crossing region becomes transparent.

For example, when a voltage is impressed to 142d, 143c and 143e, the crossing regions P1 and P2 (black regions) become transparent. Therefore, in order to obtain a pattern of two dimension formed by light scattering, for example, firstly a voltage is impressed to only 142a among the heat-generating resistive members 142a–142l and a voltage is impressed to a desired heat generating resistive member selected from heat generating resistive member crossing 142a. Then, a voltage is impressed to only 142b, and a voltage is impressed to a desired heat generating resistive member selected from heat generating resistive members crossing 142b. By repeating the above-mentioned procedures with respect to all of 142a–142l, a two-dimensional pattern can be obtained.

Figure 21:
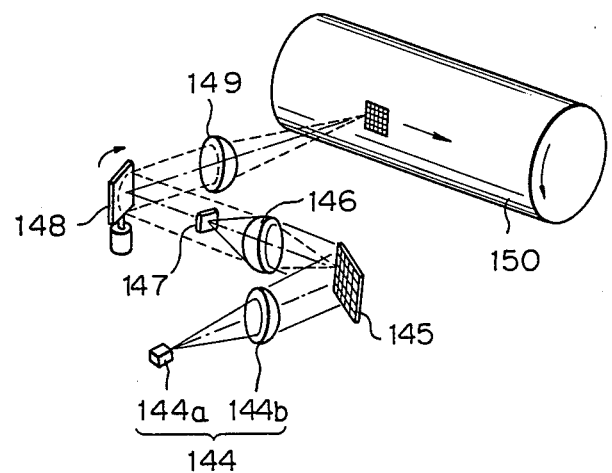
FIG. 21 illustrates an example of a light modulation apparatus formed by employing the light modulation element shown in FIGS. 20(A) and 20(B)

FIG. 21 shows an example of a light modulation apparatus according to the present invention using a light modulation element as shown in FIG. 20.

A light modulation element 145 capable of producing a two-dimensional pattern of transparent portions is irradiated with a light flux emitted from a light flux generating means 144 constituted of a light source 144a and a collimator lens 144b. A light flux not diverged by light scattering is condensed by lens 146 and shaded by a shading filter 147 located at the focal plane of lens 146.

Since the light flux scattering position of the light modulation element 145 is almost consistent with the other focal plane of lens 146, the light flux diverged by a light modulation element 145 becomes almost parallel light flux by lens 146 and an image is formed on a photosensitive medium surface 150 by a lens 149, and as a result, a two-dimensional image including a negative image corresponding to the pattern generated at transparent portions.

When a deflecting mirror 148 is placed between lens 146 and lens 149 to enable the divergent light flux to deflect, scanned images of the above-mentioned two-dimensional images can be obtained on the photosensitive member surface 150. For example, if the design is made such that a light modulation element capable of generating transparent portions two-dimensionally produce various letter patterns by light scattering, the resulting system can be used for printer terminal apparatuses such as word processor. The rotation of the above-mentioned deflection mirror is preferably intermittent rotation since the white turbid portions are not always formed simultaneously on the whole surface by the light modulation element 145.

Needless to say, the light modulation element capable of forming two-dimensional patterns can be a light modulation element of a light transmission type as shown in FIG. 14.

In the above, an example of forming transparent portions by using heat generating resistive members is described, but the transparent portions can be also produced by sanning a light beam and converting the scan beam to heat.

Figure 22:
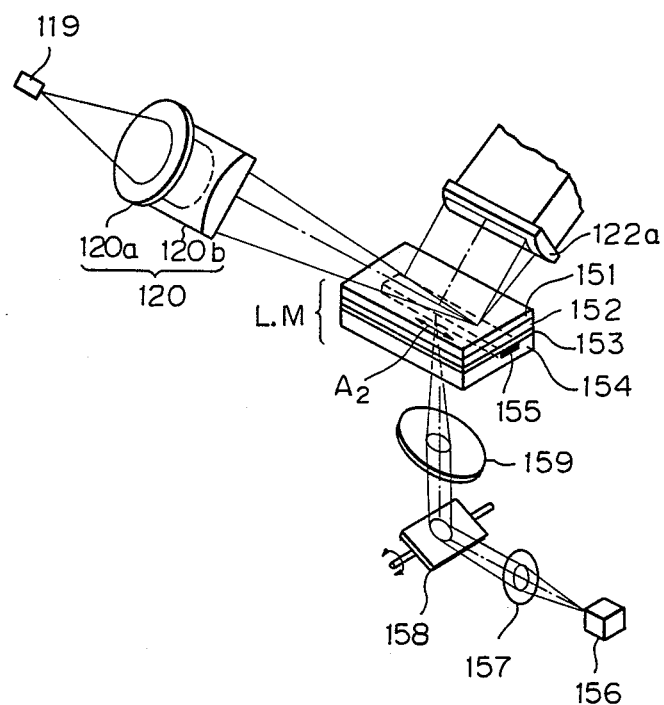
FIG. 22 illustrates another example of an optical modulation element of the present invention.

FIG. 22 shows an example where transparent portions are formed by scanning a light beam, and the system is constituted of light modulation element L.M., transparent protective plate 151, organic polymer emulsion thin layer 152, thermally conductive insulating layer 153, and transparent support 154. Support 154 is provided with a heat absorbing layer 155. 156 is a semiconductor laser capable of self modulation, and a light flux from the semiconductor laser 156 becomes a parallel beam by a collimator lens 157 and forms an image on the above-mentioned heat absorbing layer 155 by a condenser lens 159 for scanning by way of galvanomirror 58.

The heat absorbing layer 155 is constituted of a material which absorbs particularly well a light flux of a wavelength from semiconductor laser 156, and therefore, the light flux passing the heat absorbing layer 155 becomes substantially zero.

A scanning optical system is set such that when the galvanomirror 158 is rotated around the rotation axis, the light beam spot moves along the heat absorbing layer 155 in the direction of arrow A2.

At the region of heat absorbing layer 155 where beam spots by the semiconductor laser 156 are formed the light beam is converted to heat and transparent portions are formed in the organic polymer emulsion thin layer by way of insulating layer 153. Therefore, a transparent portion can be formed at a desired position by "on or off" of a beam emitted from the semiconductor laser according to the rotation of galvanomirror 158.

By providing the heat absorbing layer 155 on the whole surface and making the scanning optical system projecting a light beam to the heat absorbing layer of a two-dimensional scanning optical system type, there is obtained a light modulating element capable of effecting conversion of a light scattering state to a light non-scattering state having a two-dimensional pattern as in FIG. 22.

As mentioned above, the light modulation apparatus according to the present invention has the following advantages as compared with conventional light modulation apparatuses.

(1) By selecting an organic polymer emulsion having thermal effect, there can be obtained a relatively large divergent angle of a light flux diverged by light scattering at the white turbid portion, and therefore, divergent light and non-divergent light can be efficiently separated from each other, and the utilization efficiency of light flux and S/N ratio are high.

(2) Upon diverging by light scattering, constant scattering characteristics can be obtained without depending upon the incident angle of light flux incident on an organic polymer emulsion having white turbid portions. Therefore, the arrangement of the optical system is not subjected to any limitation.

(3) When an electrochemical crystal is used, one light modulation can be effected by using two electrodes. On the contrary, in the case of using diverging by light scattering according to the present invention, one light modulation can be made by one electrode and therefore, a modulation of high density per unit area is possible and a high quality can be attained upon display or recording.

(4) In the case of diverging a light flux by light scattering, it is not necessary to polarize the incident light flux, and even when ordinary light sources other than laser are used, the same effect can be obtained. Therefore, the apparatus can be manufactured at low cost.

(5) The heat generating resistive member for generating a transparent portion can be easily fabricated by a process for producing I.C. patterns, and it is easily possible to arrange at a high density such as 100 lines or more per 1 mm, and as a result, images of high quality can be obtained.

In addition, by using a process for producing I.C. patterns, 1,000-10,000 pieces of heat generating resistive members can be arranged on the order of micron. It is easy to arrange heat generating resistive members which provide the number of dots sufficient for scanning one line. Thus, scanning of one line can be effected simultaneously so that the speed of image recording and image display can be enhanced.

What we claim is:

1. An optical element comprising: a pair of plates between which an optical modulation liquid layer is sandwiched, the optical modulation liquid layer exhibiting a light scattering property caused by suspension of fine particle polymer when not heated and exhibiting transparency caused by dissolution of fine particle polymer when heated, the change of such light scattering property to transparency being reversible, wherein the optical modulation liquid layer contains a light-absorbing heat-generating agent.

2. An optical element according to claim 1, in which the optical modulation liquid layer contains a solvent and fine particle polymer when not heated.

3. An optical element according to claim 1, in which the polymer is at least one of polymers selected from a group consisting of polyalkenes, polydienes, polyvinyls, polystylenes, polyethers, polyimines, polyesters and polyamides.

4. An optical element according to claim 1, in which the polymer is formed from at least one selected from the monomer group consisting of slkenes, dienes, vinyls and styrenes.

5. An optical element according to claim 2, in which the solvent is at least one selected from a group consisting of water, alcohols, ketons, hydrocarbons, halogenated hydrocarbons, ethers, amides and sulfoxides.

6. An optical element according to claim 1, in which the pair of plates are faced to each other at a distance of 1 $\mu$m to 1000 $\mu$m.

7. An optical element according to claim 1, in which the light-absorbing heat-generating agent is an infrared-ray-absorbing agent.

8. An optical element according to claim 7, in which the infrared-ray-absorbing agent is at least one kind of compounds selected from a group consisting of cyanines, xanthene derivatives, thiapyrylium salt derivatives and pyrylium salt derivatives.

9. An optical element according to claim 7, in which the infrared-ray-absorbing agent is contained in the modulation liquid at a concentration of $10^{-5}$ to $10^{-2}$.

10. A light modulation apparatus comprising a signal input portion, a light receiving medium and a light modulation element between said signal input portion and said light receiving medium, wherein said light modulation element comprises the optical element of claim 1.

11. The light modulation apparatus of claim 10 further comprising an image-forming optical system for allowing light to form an image on the light receiving medium, wherein said light passes through the light modulation element.

* * * * *

UNITED STATES PATENT AND TRADEMARK OFFICE
CERTIFICATE OF CORRECTION

PATENT NO. : 4,900,135

DATED : February 13, 1990

INVENTOR(S) : SATOSHI YUASA, ET AL.

It is certified that error appears in the above-identified patent and that said Letters Patent is hereby corrected as shown below:

ON THE TITLE PAGE,
IN [57] ABSTRACT

Line 1, "comprised" should read --comprises--.

COLUMN 1

Line 16, "an" should be deleted.
    Line 62, "a" should be deleted.

COLUMN 2

Line 3, "examples" should read --example--.

COLUMN 3

Line 27, "preperably" should read --preferably--.

COLUMN 4

Line 59, "scattering" should read --scattered--.

COLUMN 6

Line 8, "scattering" should read --scattered--.
    Line 30, "(tradename," should read --(trade name,--.
    Line 34, "and like." should read --and the like.--.

UNITED STATES PATENT AND TRADEMARK OFFICE
CERTIFICATE OF CORRECTION

PATENT NO. : 4,900,135

DATED : February 13, 1990

INVENTOR(S) : SATOSHI YUASA, ET AL.

It is certified that error appears in the above-identified patent and that said Letters Patent is hereby corrected as shown below:

COLUMN 8

Line 63, "colorant" should read --colorants--.
    Line 65, "absoring" should read --absorbing--.

COLUMN 9

Line 26, "is" should read --are--.
    Line 31, "polyurethans," should read --polyurethanes,--.

COLUMN 10

Line 29, "tion" should read --tioned--.

COLUMN 11

Line 47, "elements" should read --element--.

COLUMN 12

Line 18, "rapidly" should read --rapid--.
    Line 24, "drawing" should read --drawings--.
    Line 28, "type a" should read --type or--.
    Line 59, "dissolved" should read --is dissolved--.

COLUMN 13

Line 19, "agent" should read --agents--.
    Line 49, "irradated" should read --irradiated--.

UNITED STATES PATENT AND TRADEMARK OFFICE
CERTIFICATE OF CORRECTION

PATENT NO. : 4,900,135

DATED : February 13, 1990

INVENTOR(S) : SATOSHI YUASA, ET AL.

It is certified that error appears in the above-identified patent and that said Letters Patent is hereby corrected as shown below:

COLUMN 14

Line 34, "embodiment" should read --embodiment of--.
Line 41, "infrared absorbing layer 28" should read --infrared ray absorbing layer 28--.
Line 66, "a" should read --an--.

COLUMN 15

Line 28, "resistive heater layer 27" should read --resistive heater layer 37--.

COLUMN 17

Line 13, "responsing" should read --response--.
Line 16, "responsing" should read --response--.
Line 22, "water" should read --water,--.
Line 38, "vapordeposited" should read --vapor-deposited--.
Line 62, "abovementioned" should read --above-mentioned--.

COLUMN 18

Line 26, "a" should be deleted.
Line 67, "was" should be deleted.

UNITED STATES PATENT AND TRADEMARK OFFICE
CERTIFICATE OF CORRECTION

PATENT NO. : 4,900,135

DATED : February 13, 1990

INVENTOR(S) : SATOSHI YUASA, ET AL.

It is certified that error appears in the above-identified patent and that said Letters Patent is hereby corrected as shown below:

COLUMN 19

Line 16, "ethylenedimetha-" should read --ethylene-dimetha- --.
    Line 17, "azobisisobutyronitile" should read --azobisisobutyronitrile--.
    Line 65, "spattering" should read --sputtering--.

COLUMN 20

Line 40, "is" should read --are--.

COLUMN 21

Line 65, "light shading plate 115ais" should read --light shading plate 115a is--.

COLUMN 22

Line 5, "driving" should read --driving a--.
    Line 33, "At" should read --In--.
    Line 68, "heating" should read --heat--.

COLUMN 23

Line 10, "turbid" should read --turbidity--.
    Line 13, "115bis" should read --115b is--.
    Line 25, "FIG. 12 A" should read --FIG. 12(A)--.
    Line 27, "FIG. 12 B" should read --FIG. 12(B)--.
    Line 58, "a $" should read --a--.
    Line 66, "a" should read --an--.

UNITED STATES PATENT AND TRADEMARK OFFICE
CERTIFICATE OF CORRECTION

PATENT NO. : 4,900,135

DATED : February 13, 1990

INVENTOR(S) : SATOSHI YUASA, ET AL.

It is certified that error appears in the above-identified patent and that said Letters Patent is hereby corrected as shown below:

COLUMN 24

Line 6, "an" should read --a--.
Line 20, "consists with" should read --consistent with--.
Line 44, "heatgenerating" should read --heat generating--.

COLUMN 25

Line 19, "difference" should read --differences--.
Line 40, "as" (second occurrence) should read --an--.
Line 68, "above-mentioned" should be deleted.

COLUMN 26

Line 1, "as" should read --an--.
Line 3, "above-" should be deleted.
Line 4, "mentioned" should be deleted.

COLUMN 27

Line 31, "is" should read --are--.
Line 33, "arranges" should read --arranged--.
Line 47, "dimension" should read --dimensions--.

UNITED STATES PATENT AND TRADEMARK OFFICE
CERTIFICATE OF CORRECTION

PATENT NO. : 4,900,135

DATED : February 13, 1990

INVENTOR(S) : SATOSHI YUASA, ET AL.

It is certified that error appears in the above-identified patent and that said Letters Patent is hereby corrected as shown below:

COLUMN 28

Line 9, "tions." should read --tions can be obtained.--.
Line 16, "produce" should read --produces--.
Line 31, "sanning" should read --scanning--.

COLUMN 30

Line 14, "polystylenes," should read --polystyrenes,--.
Line 18, "slkenes" should read --alkenes--.
Line 22, "ketons," should read --ketones,--.
Line 38, "$10^{-2\cdot}$" should read --$10^{-2}$.--.

Signed and Sealed this

Seventeenth Day of September, 1991

Attest:

HARRY F. MANBECK, JR.

*Attesting Officer*   *Commissioner of Patents and Trademarks*